(12) United States Patent
Li et al.

(10) Patent No.: US 12,316,515 B2
(45) Date of Patent: May 27, 2025

(54) NETWORK PERFORMANCE REPORTING METHOD AND APPARATUS

(71) Applicant: HUAWEI TECHNOLOGIES CO., LTD., Shenzhen (CN)

(72) Inventors: Shijun Li, Xi'an (CN); Baoyi Wang, Xi'an (CN); Jian Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 439 days.

(21) Appl. No.: 17/557,243

(22) Filed: Dec. 21, 2021

(65) Prior Publication Data
US 2022/0116811 A1 Apr. 14, 2022

Related U.S. Application Data

(63) Continuation of application No. PCT/CN2020/081239, filed on Mar. 25, 2020.

(30) Foreign Application Priority Data

Jul. 3, 2019 (CN) .......................... 201910595257.9

(51) Int. Cl.
*H04L 43/06* (2022.01)
*H04L 41/12* (2022.01)
*H04W 24/10* (2009.01)

(52) U.S. Cl.
CPC ............. *H04L 43/06* (2013.01); *H04W 24/10* (2013.01); *H04L 41/12* (2013.01)

(58) Field of Classification Search
USPC ......................................................... 370/241
See application file for complete search history.

(56) References Cited

U.S. PATENT DOCUMENTS

| 6,298,308 B1 | 10/2001 | Reid et al. |
| 2009/0204695 A1 | 8/2009 | Büsgen et al. |

(Continued)

FOREIGN PATENT DOCUMENTS

| CN | 102238598 A | 11/2011 |
| CN | 104579760 A | 4/2015 |

(Continued)

OTHER PUBLICATIONS

3GPP. "3rd Generation Partnership Project; Technical Specification Group Services and System Aspects; System Architecture for the 5G System; Stage 2 (Release 16)." 3GPP TS 23.501 V16.1.0 (Jun. 2019). 368 pages.

(Continued)

*Primary Examiner* — Basil Ma
*Assistant Examiner* — Luna Weissberger
(74) *Attorney, Agent, or Firm* — Maier & Maier, PLLC

(57) ABSTRACT

The embodiments provide a network performance reporting method and apparatus. The method includes: a data analysis network element receives a first subscription message from a first network element, where the first subscription message is used to request to subscribe to network performance parameter information of a first area; the data analysis network element obtains the network performance parameter information of the first area from an access network device corresponding to the first area, where the network performance parameter information of the first area is used to indicate network performance of the first area; and when determining that a first reporting condition is met, the data analysis network element sends the network performance parameter information of the first area or a network performance level corresponding to the network performance parameter information of the first area to the first network element.

21 Claims, 14 Drawing Sheets

(56) References Cited

U.S. PATENT DOCUMENTS

| | | | |
|---|---|---|---|
| 2012/0109733 A1 | 5/2012 | Roper et al. | |
| 2013/0117842 A1 | 5/2013 | Kakadia et al. | |
| 2013/0191185 A1 | 7/2013 | Galvin | |
| 2014/0019228 A1 | 1/2014 | Aggarwal et al. | |
| 2014/0068703 A1 | 3/2014 | Balus et al. | |
| 2015/0113118 A1 | 4/2015 | Jain et al. | |
| 2015/0242869 A1 | 8/2015 | Unser et al. | |
| 2016/0028657 A1 | 1/2016 | Mibu | |
| 2016/0094412 A1 | 3/2016 | Fichou et al. | |
| 2016/0330134 A1 | 11/2016 | Almadi | |
| 2016/0359688 A1 | 12/2016 | Gao et al. | |
| 2017/0102997 A1 | 4/2017 | Purushothaman et al. | |
| 2017/0230846 A1 | 8/2017 | Wang et al. | |
| 2018/0181112 A1 | 6/2018 | Wang et al. | |
| 2020/0288296 A1* | 9/2020 | Fiorese | H04L 41/40 |
| 2020/0396657 A1* | 12/2020 | Feder | H04W 36/0061 |
| 2021/0266765 A1* | 8/2021 | Zhang | H04W 24/02 |
| 2022/0116814 A1* | 4/2022 | Di Girolamo | H04L 65/80 |
| 2022/0167262 A1* | 5/2022 | Ding | H04L 67/55 |

FOREIGN PATENT DOCUMENTS

| | | | | |
|---|---|---|---|---|
| CN | 106028380 A | | 10/2016 | |
| CN | 106998556 A | * | 8/2017 | G06F 16/29 |
| CN | 107371179 A | | 11/2017 | |
| CN | 108737204 A | | 11/2018 | |
| CN | 108768734 A | | 11/2018 | |
| CN | 109246745 A | | 1/2019 | |
| CN | 109392002 A | | 2/2019 | |
| EP | 2674876 A1 | | 12/2013 | |
| WO | 2015116047 A1 | | 8/2015 | |
| WO | 2018088985 A1 | | 5/2018 | |
| WO | 2018141169 A1 | | 8/2018 | |

OTHER PUBLICATIONS

3GPP. 3rd Generation Partnership Project; Technical Specification Group Services and System Aspects; Study of Enablers for Network Automation for 5G (Release 16). 3GPP TR 23.791 V16.2.0 (Jun. 2019). 124 pages.

Lenovo et al., "Update solution 5 in TR 23.791",SA WG2 Meeting #128 S2-186924, Jul. 2-6, 2018, Vilnius, Lithuania, 4 Pages.

ZTE, "Solution on the mobility decision",SA WG2 Meeting #128bis S2-188238, Aug. 20-24, 2018, Sophia Antipolis, France, 5 Pages.

Huawei et al., "Update to Network Performance Analytics",SA WG2 Meeting #133 S2-1905541, May 13-17, 2019, Reno, NV, USA, 3 Pages.

3GPP TS 23.288 V16.0.0 (Jun. 2019), "3rd Generation Partnership Project; Technical Specification Group Services and System Aspects;Architecture enhancements for 5G System (5GS) to support network data analytics services (Release 16)", 52 Pages.

* cited by examiner

NETWORK PERFORMANCE REPORTING METHOD AND APPARATUS

CROSS-REFERENCE TO RELATED APPLICATIONS

This application is a continuation of International Patent Application No. PCT/CN2020/081239, filed on Mar. 25, 2020, which claims priority to Chinese Patent Application No. 201910595257.9, filed on Jul. 3, 2019. The disclosures of the aforementioned applications are hereby incorporated by reference in their entireties.

TECHNICAL FIELD

The embodiments relate to the field of mobile communication technologies, and in particular, to a network performance reporting method and apparatus.

BACKGROUND

According to 3rd generation partnership project (3GPP) protocols, a Network Data Analysis Function (NWDAF) in a 5th generation (5G) network architecture may perform network data analysis. The (NWDAF may obtain data from a network function (NF) network element and an operation, administration, and maintenance (OAM) system, and provide a result for the NF network element and an application function (AF) for use after performing analysis and processing.

The data analyzed by the NWDAF is usually obtained from the NF network element and the OAM system. The data, however, is not the latest real-time data and cannot accurately reflect current network performance.

SUMMARY

The embodiments provide a network performance reporting method and apparatus, to obtain real-time and accurate network performance.

According to a first aspect, the embodiments provide a network performance reporting method. The method includes: a data analysis network element receives a first subscription message from a first network element, where the first subscription message is used to request to subscribe to network performance parameter information of a first area; the data analysis network element obtains the network performance parameter information of the first area from an access network device corresponding to the first area, where the network performance parameter information of the first area is used to indicate network performance of the first area; and when determining that a first reporting condition is met, the data analysis network element sends the network performance parameter information of the first area or sends a network performance level corresponding to the network performance parameter information of the first area to the first network element, where the network performance level is used to indicate quality of the network performance of the first area. Based on this solution, the first network element may subscribe to the network performance parameter information from the data analysis network element, and after obtaining the network performance parameter information from the access network device, the data analysis network element may report the network performance parameter information to the first network element. Because the network performance parameter information obtained from the access network device can more accurately reflect real-time performance of a cell, the first network element can perform more precise control or application.

In a possible implementation method, that the data analysis network element obtains the network performance parameter information of the first area from an access network device corresponding to the first area includes: the data analysis network element sends a second subscription message to the access network device corresponding to the first area, where the second subscription message is used to request to subscribe to the network performance parameter information of the first area; and the data analysis network element receives the network performance parameter information of the first area from the access network device corresponding to the first area, where the network performance parameter information of the first area is sent when a second reporting condition is met, where the second reporting condition includes one or both of the following: a reporting periodicity arrives, and the network performance parameter information of the first area that is subscribed by the data analysis network element reaches a first threshold. Based on this solution, the data analysis network element obtains the network performance parameter information through subscription from the access network device, and this helps automatically obtain the network performance parameter information.

In a possible implementation method, the network performance parameter information of the first area includes a network performance parameter and a corresponding value, and the network performance parameter includes one or more of the following: a quantity of radio resource control (RRC) connections, a quantity of protocol data unit (PDU) sessions, physical resource block (PRB) utilization, a handover success rate, a handover failure rate, device-to-device (D2D) resource utilization, Uu interface resource utilization, physical downlink control channel (PDCCH) congestion, a random access channel (RACH) success rate, a RACH failure rate, and an air interface delay.

In a possible implementation method, the first area includes one or more cells, and the first subscription message includes one or more cell identities; or the first area includes one or more tracking areas, and the first subscription message includes one or more tracking area identities. Based on this solution, the network performance parameter information of the first area may be subscribed, to monitor the network performance in the given area.

In a possible implementation method, the first reporting condition includes one or both of the following: the network performance parameter information subscribed by the first network element reaches a second threshold, and the data analysis network element obtains the network performance parameter information of the first area for the first time.

In a possible implementation method, the first subscription message is further used to request to subscribe to network performance parameter prediction information of the first area; and the method further includes: the data analysis network element determines the network performance parameter prediction information of the first area based on the network performance parameter information of the first area and historical network performance parameter information of the first area; and when determining that a third reporting condition is met, the data analysis network element sends the network performance parameter prediction information of the first area to the first network element. Based on this solution, the network performance parameter prediction information of the first area may be further obtained, to monitor the network performance in the given area in a future period of time.

In a possible implementation method, the third reporting condition includes one or both of the following: the network performance parameter prediction information of the first area that is subscribed by the first network element reaches a third threshold, and the data analysis network element obtains the network performance parameter prediction information of the first area for the first time.

In a possible implementation method, the first subscription message includes an identifier of a terminal device, and the first area is a cell in which the terminal device is located. Based on this solution, a network performance parameter information of the cell in which the terminal device is located may be obtained, to determine impact of the network performance on the terminal device.

In a possible implementation method, the first reporting condition includes one or both of the following: the terminal device enters the first area, and the network performance parameter information of the first area that is subscribed by the first network element reaches a fourth threshold.

In a possible implementation method, the first subscription message is further used to request to subscribe to network performance parameter prediction information of a second area, and the second area is a next cell that the terminal device is to enter; and the method further includes: the data analysis network element obtains network performance parameter information of the second area from an access network device corresponding to the second area, where the network performance parameter information of the second area is used to indicate network performance of the second area; the data analysis network element determines the network performance parameter prediction information of the second area based on the network performance parameter information of the second area and historical network performance parameter information of the second area; and when determining that a fourth reporting condition is met, the data analysis network element sends the network performance parameter prediction information of the second area to the first network element. Based on this solution, a network performance prediction parameter information of a cell in which the terminal device is located may be obtained, to determine impact of the network performance on the terminal device in a future period of time.

In a possible implementation method, the fourth reporting condition includes one or both of the following: the data analysis network element determines that the terminal device is to enter the second area, and the network performance parameter prediction information of the second area that is subscribed by the first network element reaches a fifth threshold.

In a possible implementation method, the method further includes: the data analysis network element obtains location information of the terminal device from the access network device corresponding to the first area, where the location information of the terminal device is information about the first area; the data analysis network element determines a moving track of the terminal device based on the location information of the terminal device and historical location information of the terminal device, where the moving track is used to indicate a moving direction of the terminal device and locations passed by the terminal device when the terminal device moves; and the data analysis network element determines, based on the moving track and a network topology structure, information about the second area that the terminal device is to enter, where the network topology structure is used to indicate distribution locations of cells in a network, and the cells include the first area and the second area. Based on this solution, a method for determining the moving track of the terminal device at a cell granularity is provided, so that the information about the next cell that the terminal device is to enter can be predicted, and further impact of the network performance on the terminal device can be determined based on the network performance parameter information of the next cell.

In a possible implementation method, that the data analysis network element obtains location information of the terminal device from the access network device corresponding to the first area includes: the data analysis network element sends a third subscription message to the access network device corresponding to the first area, where the third subscription message is used to request to subscribe to the location information of the terminal device; and the data analysis network element receives the location information of the terminal device from the access network device, where the location information of the terminal device is sent when a fifth reporting condition is met, where the fifth reporting condition includes one or both of the following: a location of the terminal device changes, and a reporting periodicity arrives.

In a possible implementation method, the method further includes: the data analysis network element obtains a measurement report of the terminal device from the access network device; the data analysis network element determines longitude and latitude information of the terminal device based on the measurement report of the terminal device; the data analysis network element determines a moving track of the terminal device based on the longitude and latitude information of the terminal device and the longitude and latitude information of the terminal device, where the moving track is used to indicate a moving direction of the terminal device and locations passed by the terminal device when the terminal device moves; and the data analysis network element determines, based on the moving track and a network topology structure, the second area that the terminal device is to enter, where the network topology structure is used to indicate distribution locations of cells in a network, and the cells include the first area and the second area. Based on this solution, a method for determining the moving track of the terminal device at a longitude and latitude granularity is provided, so that the information about the next cell that the terminal device is to enter can be predicted, and further impact of the network performance on the terminal device can be determined based on the network performance parameter information of the next cell.

In a possible implementation method, that the data analysis network element obtains a measurement report of the terminal device from the access network device includes: the data analysis network element sends a fourth subscription message to the access network device corresponding to the first area, where the fourth subscription message is used to request to subscribe to the measurement report of the terminal device; and the data analysis network element receives the measurement report of the terminal device from the access network device corresponding to the first area, where the measurement report of the terminal device is sent when a sixth reporting condition is met, where the sixth reporting condition includes one or both of the following: the access network device corresponding to the first area receives the measurement report, and a reporting periodicity arrives.

In a possible implementation method, the measurement report of the terminal device includes one or more of the following: reference signal received power (RSRP), reference signal received quality (RSRQ), a signal to interference plus noise ratio (SINR), a throughput of the terminal device, and channel state information (CSI).

In a possible implementation method, the method further includes: the data analysis network element obtains network element performance information from a second network element corresponding to the first area, where the network element performance information is used to indicate performance of the second network element; and the data analysis network element sends the network element performance information of the first area to the first network element. Based on this solution, the data analysis network element further obtains the network element performance information from the second network element, and this helps more accurately determine the network performance of the first area.

In a possible implementation method, the network element performance information includes one or more of the following: load of a network element, a throughput of the network element, and a quantity of users of the network element.

In a possible implementation method, the method further includes: the data analysis network element obtains fault information of a network element corresponding to the first area from an OAM system corresponding to the first area; and the data analysis network element sends the fault information of the network element corresponding to the first area to the first network element. Based on this solution, the data analysis network element further obtains the fault information of the network element from the OAM system, and this helps more accurately determine the network performance of the first area.

According to a second aspect, the embodiments provide a network performance reporting method. The method includes: an access network device receives a second subscription message from a data analysis network element, where the second subscription message is used to request to subscribe to network performance parameter information of a first area, and the network performance parameter information of the first area is used to indicate network performance of the first area; and when a second reporting condition is met, the access network device sends the network performance parameter information of the first area to the data analysis network element. Based on this solution, because the network performance parameter information obtained by the data analysis network element from the access network device can more accurately reflect real-time performance of a cell, more precise control or application can be performed.

In a possible implementation method, the second reporting condition includes one or both of the following: a reporting periodicity arrives, and the network performance parameter information of the first area that is subscribed by the data analysis network element reaches a first threshold.

In a possible implementation method, the network performance parameter information of the first area includes a network performance parameter and a corresponding value, and the network performance parameter includes one or more of the following: a quantity of RRC connections, a quantity of PDU sessions, PRB utilization, a handover success rate, a handover failure rate, D2D resource utilization, Uu interface resource utilization, PDCCH congestion, a RACH success rate, a RACH failure rate, and an air interface delay.

In a possible implementation method, the method further includes: the access network device receives a third subscription message from the data analysis network element, where the third subscription message is used to request to subscribe to location information of the terminal device; and when a fifth reporting condition is met, the access network device sends the location information of a terminal device to the data analysis network element.

In a possible implementation method, the fifth reporting condition includes one or both of the following: a location of the terminal device changes, and a reporting periodicity arrives.

In a possible implementation method, the method further includes: the access network device receives a fourth subscription message from the data analysis network element, where the fourth subscription message is used to request to subscribe to a measurement report of the terminal device; and when a sixth reporting condition is met, the access network device sends the measurement report of the terminal device to the data analysis network element.

In a possible implementation method, the sixth reporting condition includes one or both of the following: the access network device corresponding to the first area receives the measurement report of the terminal device, and a reporting periodicity arrives.

In a possible implementation method, the measurement report of the terminal device includes one or more of the following: RSRP, RSRQ, a SINR, a throughput of the terminal device, and CSI.

According to a third aspect, the embodiments provide a network performance reporting method. The method includes: an OAM system receives a subscription message from a data analysis network element, where the subscription message is used to request to subscribe to fault information of a network element corresponding to a first area; and when a reporting condition is met, the OAM system sends the fault information of the network element corresponding to the first area to the data analysis network element. Based on this solution, the data analysis network element obtains the fault information of the network element from the OAM system, and this helps more accurately determine network performance of the first area.

In a possible implementation method, the reporting condition includes: a fault alarm occurs on the network element corresponding to the first area.

According to a fourth aspect, the embodiments provide a network performance reporting method. The method includes: a second network element receives a subscription message from a data analysis network element, where the subscription message is used to request to subscribe to network element performance information of the second network element, and the network element performance information is used to indicate performance of the second network element. When a reporting condition is met, the second network element sends the network element performance information of the second network element to the data analysis network element. Based on this solution, the data analysis network element obtains the network element performance information from the second network element, and this helps more accurately determine network performance of a first area.

In a possible implementation method, the reporting condition includes one or both of the following: a reporting periodicity arrives, and the network performance information of the second network element that is subscribed by the data analysis network element reaches a threshold.

In a possible implementation method, the network element performance information includes one or more of the following: load of a network element, a throughput of the network element, and a quantity of users of the network element.

According to a fifth aspect, the embodiments provide a network performance reporting apparatus. The apparatus may be a data analysis network element, or may be a chip used in a data analysis network element. The apparatus has a function of implementing the embodiments of the first aspect. The function may be implemented by hardware, or may be implemented by hardware executing corresponding software. The hardware or the software includes one or more modules corresponding to the foregoing function.

According to a sixth aspect, the embodiments provide a network performance reporting apparatus. The apparatus may be an access network device, or may be a chip used in an access network device. The apparatus has a function of implementing the embodiments of the second aspect. The function may be implemented by hardware, or may be implemented by hardware executing corresponding software. The hardware or the software includes one or more modules corresponding to the foregoing function.

According to a seventh aspect, the embodiments provide a network performance reporting apparatus. The apparatus may be an OAM system, or may be a chip used in an OAM system. The apparatus has a function of implementing the embodiments of the third aspect. The function may be implemented by hardware, or may be implemented by hardware executing corresponding software. The hardware or the software includes one or more modules corresponding to the foregoing function.

According to an eighth aspect, the embodiments provide a network performance reporting apparatus. The apparatus may be a second network element, or may be a chip used in a second network element. The apparatus has a function of implementing the embodiments of the fourth aspect. The function may be implemented by hardware, or may be implemented by hardware executing corresponding software. The hardware or the software includes one or more modules corresponding to the foregoing function.

According to a ninth aspect, the embodiments provide a network performance reporting apparatus. The apparatus includes a processor and a memory. The memory is configured to store computer-executable instructions. When the apparatus runs, the processor executes the computer-executable instructions stored in the memory, to enable the apparatus to perform the methods in the foregoing aspects.

According to a tenth aspect, the embodiments provide a network performance reporting apparatus. The apparatus includes units or elements configured to perform the steps in the foregoing aspects.

According to an eleventh aspect, the embodiments provide a network performance reporting apparatus. The apparatus includes a processor and an interface circuit. The processor is configured to communicate with another apparatus through the interface circuit, and perform the methods in the foregoing aspects. There are one or more processors.

According to a twelfth aspect, the embodiments provide a network performance reporting apparatus. The apparatus includes a processor, configured to be connected to a memory, and configured to invoke a program stored in the memory, to perform the methods in the foregoing aspects. The memory may be located inside the apparatus, or may be located outside the apparatus. In addition, there are one or more processors.

According to a thirteenth aspect, the embodiments further provide a computer-readable storage medium. The computer-readable storage medium stores instructions; and when the instructions are run on a computer, the processor is enabled to perform the methods in the foregoing aspects.

According to a fourteenth aspect, the embodiments further provide a computer program product including instructions; and when the computer program product runs on a computer, the computer is enabled to perform the methods in the foregoing aspects.

According to a fifteenth aspect, the embodiments further provide a chip system. The chip system includes a processor, configured to perform the methods in the foregoing aspects.

According to a sixteenth aspect, the embodiments provide a network performance reporting method. The method includes:

A data analysis network element receives a first subscription message from a first network element, where the first subscription message is used to request to subscribe to network performance parameter information of a first area;

the data analysis network element obtains the network performance parameter information of the first area from an access network device corresponding to the first area, where the network performance parameter information of the first area is used to indicate network performance of the first area;

when determining that a first reporting condition is met, the data analysis network element sends the network performance parameter information of the first area or sends a network performance level corresponding to the network performance parameter information of the first area to the first network element, where the network performance level is used to indicate quality of the network performance of the first area; and the first network element receives, from the data analysis network element, the network performance parameter information of the first area or receives the network performance level corresponding to the network performance parameter information of the first area.

According to a seventeenth aspect, the embodiments provide a network performance reporting system. The system includes a data analysis network element and a first network element, where the data analysis network element is configured to: receive a first subscription message from the first network element, where the first subscription message is used to request to subscribe to network performance parameter information of a first area; obtain the network performance parameter information of the first area from an access network device corresponding to the first area, where the network performance parameter information of the first area is used to indicate network performance of the first area; and when determining that a first reporting condition is met, send the network performance parameter information of the first area or send a network performance level corresponding to the network performance parameter information of the first area to the first network element, where the network performance level is used to indicate quality of the network performance of the first area; and the first network element is configured to: receive, from the data analysis network element, the network performance parameter information of the first area or receive the network performance level corresponding to the network performance parameter information of the first area.

DETAILED DESCRIPTION OF THE EMBODIMENTS

To make objectives, solutions, and advantages of the embodiments clearer, the following further describes the embodiments in detail with reference to accompanying drawings. A specific operation method in method embodiments may also be applied to an apparatus embodiment or a system embodiment. In descriptions of the embodiments, unless otherwise specified, "a plurality of" means two or more than two.

Figure 1A:
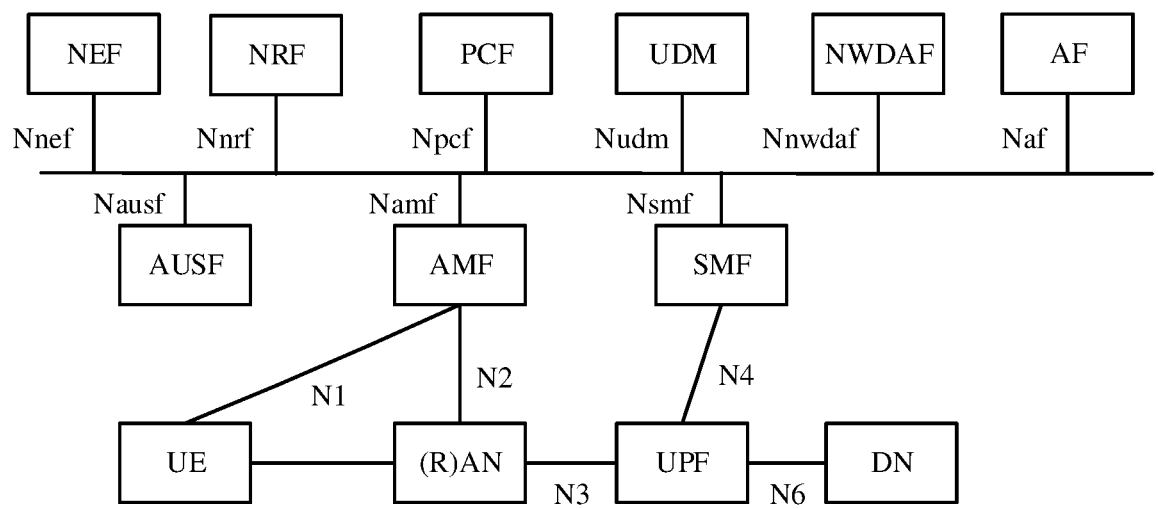
FIG. 1A is a schematic diagram of a 5G network architecture based on a service-oriented architecture.

FIG. 1A is a schematic diagram of a 5G network architecture based on a service-oriented architecture. The 5G network architecture shown in FIG. 1A may include three parts: a terminal device, a data network (DN), and a carrier network. The following describes functions of some network elements.

The carrier network may include one or more of the following network elements: a network exposure function (NEF) network element, a policy control function (PCF) network element, a unified data management (UDM) network element, a network repository function (NRF) network element, an AF network element, an NWDAF network element, an authentication server function (AUSF) network element, an access and mobility management function (AMF) network element, a session management function (SMF) network element, a (radio) access network ((R)AN), a user plane function (UPF) network element, and the like. In the foregoing carrier network, the parts other than the (radio) access network may be referred to as core network parts. For ease of description, an example in which the (R)AN is referred to as a RAN is used below for description.

The terminal device (which may also be referred to as user equipment (UE)) is a device that has a wireless transceiver function, and may be deployed on land, for example, an indoor device, an outdoor device, a handheld device, or a vehicle-mounted device; or may be deployed on water (for example, on a steamship); or may be deployed in the air (for example, on an airplane, a balloon, or a satellite). The terminal device may be a mobile phone, a tablet computer (pad), a computer that has a wireless transceiver function, a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in transportation safety, a wireless terminal in a smart city, a wireless terminal in a smart home, or the like. For ease of description, the terminal device is referred to as UE in subsequent descriptions of the embodiments.

The terminal device may establish a connection to the carrier network through an interface (for example, N1) provided by the carrier network, and use a service such as data and/or a voice provided by the carrier network. The terminal device may further access the DN through the carrier network, and use a carrier service deployed on the DN and/or a service provided by a third party. The third party may be a service provider other than the carrier network and the terminal device, and may provide a service such as data and/or a voice to the terminal device. A specific representation form of the third party may be determined based on an actual application scenario, and is not limited herein.

The RAN is a sub-network of the carrier network, and is an implementation system between a service node in the carrier network and the terminal device. To access the carrier network, the terminal device first passes through the RAN, and then may be connected to the service node of the carrier network through the RAN. A RAN device in this application is a device that provides a wireless communication function to the terminal device, and the RAN device is also referred to as an access network device. The RAN device in the embodiments includes, but is not limited to: a next generation NodeB (gNodeB, gNB), an evolved NodeB (eNB), a radio network controller (RNC), a NodeB (NB), a base station controller (BSC), a base transceiver station (BTS), a home NodeB (for example, a home evolved NodeB HNB), a baseband unit (BBU), a transmission reception point (TRP), a transmission point (TP), a mobile switching center, and the like in 5G. For ease of description, the RAN device is referred to as a RAN for short in this application.

The AMF network element is a control plane network element provided by the carrier network, and is responsible for access control and mobility management when the terminal device accesses the carrier network, for example, including functions such as mobility status management, temporary user identity assignment, and user authentication and authorization.

The SMF network element is a control plane network element provided by the carrier network, and is responsible for managing a protocol data unit (PDU) session of the terminal device. The PDU session is a channel used to transmit a PDU, and the PDU needs to be transmitted between the terminal device and the DN through the PDU session. The SMF network element is responsible for establishment, maintenance, deletion, and the like of the PDU session. The SMF network element includes session related functions such as session management (for example, session establishment, modification, and release, including tunnel maintenance between the UPF and the AN), selection and control of the UPF network element, service and session continuity (SSC) mode selection, and roaming.

The UPF network element is a gateway provided by a carrier, and is a gateway for communication between the carrier network and the DN. The UPF network element includes user plane related functions such as packet routing and transmission, packet detection, service utilization reporting, quality of service (QoS) processing, lawful interception, uplink packet detection, and downlink packet storage.

The DN may also be referred to as a packet data network (PDN), and is a network located outside the carrier network. The carrier network may access a plurality of DNs, and a plurality of services may be deployed on the DNs, to provide services such as a data service and/or a voice service to the terminal device. For example, the DN is a private network of a smart factory, a sensor installed in a workshop of the smart factory may be a terminal device, a control server of the sensor is deployed in the DN, and the control server may provide a service to the sensor. The sensor may communicate with the control server, to obtain instructions of the control server, transmit collected sensor data to the control server according to the instructions, and the like. For another example, the DN is an internal office network of a company, a mobile phone or a computer of an employee of the company may be a terminal device, and the mobile phone or the computer of the employee may access information, data resources, and the like on the internal office network of the company.

The UDM network element is a control plane network element provided by the carrier, and is responsible for storing information such as a subscription permanent identifier (SUPI), a credential, a security context, and subscription data of a subscriber in the carrier network. The information stored in the UDM network element may be used for authentication and authorization when the terminal device accesses the carrier network. The subscriber in the carrier network may be a user using a service provided by the carrier network, for example, a user using a subscriber identification module card of China Telecom, or a user using a subscriber identification module card of China Mobile. The subscription permanent identifier SUPI of the subscriber may be a number of the subscriber identification module card or the like. The credential and the security context of the subscriber may be stored small files such as an encryption key of the subscriber identification module card or information related to encryption of the subscriber identification module card, and are used for authentication and/or authorization. The security context may be a cookie, a token, or the like stored in a local terminal (for example, a mobile phone) of the user. The subscription data of the subscriber may be a supporting service of the subscriber identification module card, for example, a data package or an available network of the subscriber identification module card. It should be noted that the permanent identifier, the credential, the security context, the authentication cookie, and the token are equivalent to information related to authentication and authorization, and are not limited or distinguished between each other for ease of description in the embodiments. Unless otherwise specified, the security context is used as an example for description in the embodiments. However, the embodiments are also applicable to authentication and/or authorization information described in another expression manner.

The AUSF network element is a control plane network element provided by the carrier, and may be usually used for primary authentication, for example, authentication between the terminal device (the subscriber) and the carrier network. After receiving an authentication request initiated by the subscriber, the AUSF network element may perform authentication and/or authorization on the subscriber by using authentication information and/or authorization information stored in the UDM network element, or generate authentication and/or authorization information of the subscriber by using the UDM network element. The AUSF network element may feed back the authentication information and/or authorization information to the subscriber.

The NEF network element is a control plane network element provided by the carrier. The NEF network element securely exposes an external interface of the carrier network to the third party. When the SMF network element needs to communicate with a third-party network element, the NEF network element may serve as a relay for communication between the SMF network element and the third-party network element. When the NEF network element serves as the relay, the NEF network element may translate identification information of the subscriber and identification information of the third-party network element. For example, when the NEF sends the SUPI of the subscriber from the carrier network to the third party, the NEF may translate the SUPI into an external identity (ID) corresponding to the subscriber. When the NEF network element sends the external ID (an ID of the third-party network element) to the carrier network, the NEF network element may translate the external ID into the SUPI.

The application function (AF) network element mainly provides an application layer service, and further supports interaction with a 5G core network to provide a service, for example, affecting a data routing decision and a policy control function, or providing some third-party services to a network side. During application, the AF network element generally refers to a third-party server or an application server.

The PCF network element is a control plane function provided by the carrier, and is configured to provide a policy to a network element. In an implementation, the policy may include an access control policy, a mobility management policy, a charging-related policy, a QoS-related policy, an authorization-related policy, and the like.

The NRF network element may be configured to provide a network element discovery function, and provide, based on a request of another network element, network element information corresponding to a network element type, for example, address information and/or identification information. The NRF further provides a network element management service, for example, registration, update, and deregistration of a network element and subscription and push of a network element status.

In FIG. 1A, Nnef, Nausf, Npcf, Nudm, Naf, Namf, Nsmf, N1, N2, N3, N4, and N6 are interface sequence numbers. For meanings of these interface sequence numbers, refer to meanings defined in the 3GPP standard protocol. This is not limited herein.

Figure 1B:
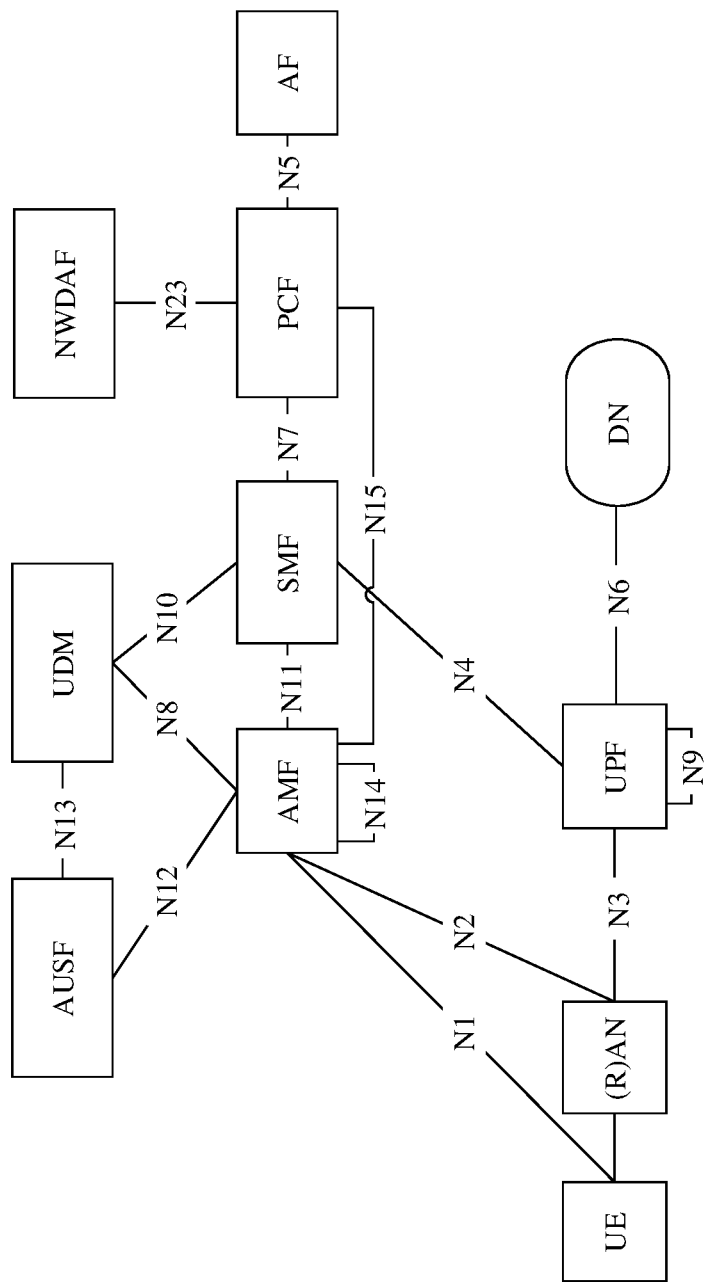
FIG. 1B is a schematic diagram of a 5G network architecture based on a point-to-point interface.

FIG. 1B is a schematic diagram of a 5G network architecture based on a point-to-point interface. For descriptions of functions of network elements, refer to descriptions of functions of corresponding network elements in FIG. 1A. Details are not described again. A main difference between FIG. 1B and FIG. 1A lies in that interfaces between network elements in FIG. 1B are point-to-point interfaces rather than service-oriented interfaces.

In the architecture shown in FIG. 1B, an interface between the UE and the AMF network element is referred to as an N1 interface. An interface between the AMF network element and the RAN device is referred to as an N2 interface. An interface between the RAN device and the UPF network element may be referred to as an N3 interface. An interface between the SMF network element and the UPF network element is referred to as an N4 interface. An interface between the PCF network element and the AF network element is referred to as an N5 interface. An interface between the UPF network element and the DN is referred to as an N6 interface. An interface between the SMF network element and the PCF network element is referred to as an N7 interface. An interface between the AMF network element and the UDM network element is referred to as an N8 interface. An interface between different UPF network elements is referred to as an N9 interface. An interface between the UDM network element and the SMF network element is referred to as an N10 interface. An interface between the AMF network element and the SMF network element is referred to as an N11 interface. An interface between the AUSF network element and the AMF network element is referred to as an N12 interface. An interface between the AUSF network element and the UDM network element is referred to as an N13 interface. An interface between different AMF network elements is referred to as an N14 interface. An interface between the AMF network element and the PCF network element is referred to as an N15 interface. An interface between the NWDAF network element and the PCF network element is referred to as an N23 interface.

Network function (NF) network elements in this application may be core network elements in FIG. 1A or FIG. 1B, namely, 5G core network (5GC) NFs, or may be future communication systems, for example, may be core network elements in 6th generation (6G), namely 6GC NFs. For ease of description, an example in which NFs are 5GC NFs is used for description in the embodiments. It should be noted that, in subsequent descriptions of the embodiments, an NF may be referred to as a 5GC NF. When there are a plurality of NFs, the NFs may also be described as 5GC NFs, or referred to as NFs for short.

Figure 1C:
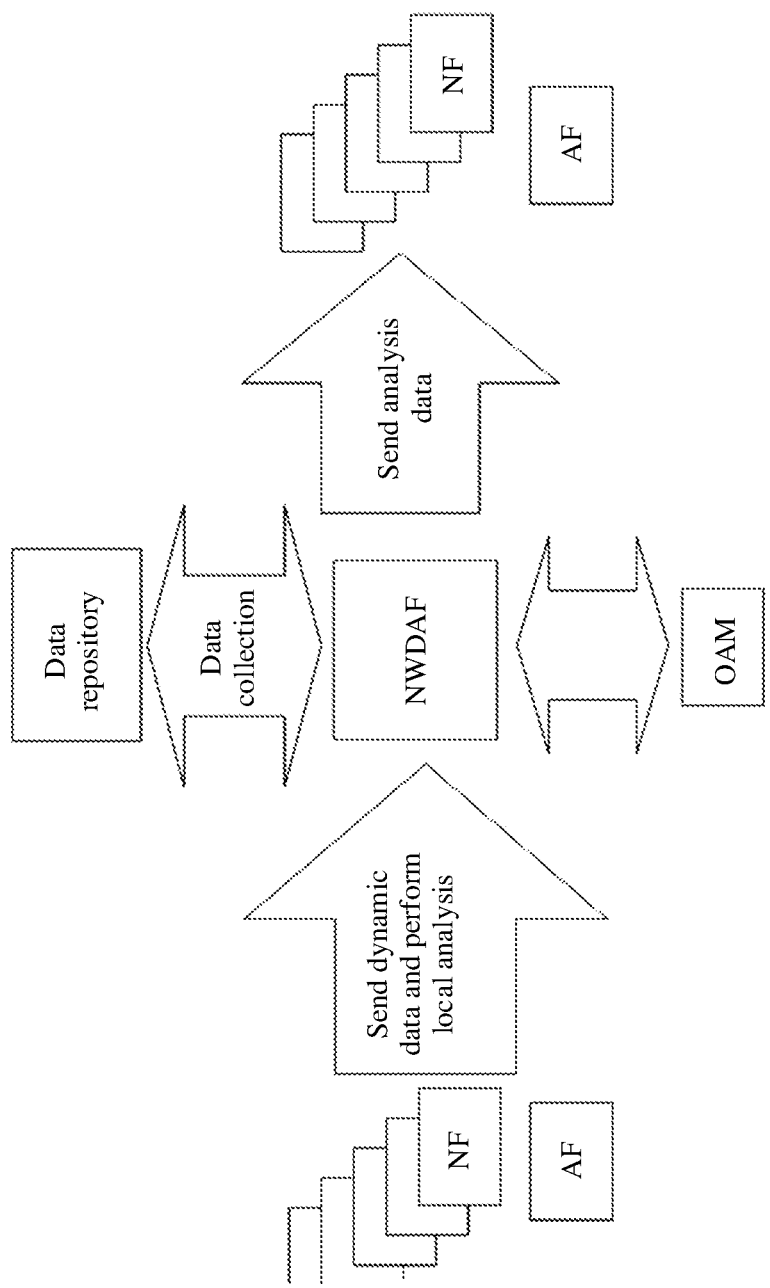
FIG. 1C shows a possible network architecture to which the embodiments are applicable.

FIG. 1C shows a possible network architecture to which the embodiments are applicable. The network architecture includes a data analysis network element, a NF network element, and an AF network element. In a possible implementation, the network architecture may further include a data repository (data repository) and an OAM system of a carrier network.

The data analysis network element can obtain to-be-analyzed data from one or more of the NF network element (for example, the SMF, the PCF, the RAN, or the UPF shown in FIG. 1A or FIG. 1B), the AF, the data repository, or the OAM, and then performs analysis and obtains a data analysis result. Data analysis performed by the data analysis element may be triggered based on a data analysis request or a subscription message sent by a consumer network element (for example, the consumer network element may be an NF network element, a RAN device, or a terminal device), or triggered by the data analysis network element according to another condition, such as periodic triggering or initial event triggering. After obtaining the data analysis result, the data analysis network element may send the data analysis result to the consumer network element that requests to obtain the data analysis result, or store the data analysis result in the data repository, or store the data analysis result in the data analysis network element.

In the embodiments, the data analysis network element is a network element that has functions of collecting and analyzing data and obtaining a data analysis result, may be the NWDAF network element in FIG. 1A or FIG. 1B, or may be a management data analysis service (MDAS) network element or another network element that has similar functions. For ease of description, in subsequent descriptions of the embodiments, an example in which the data analysis network element is an NWDAF network element in 5G is used for description, and the NWDAF network element may be referred to as an NWDAF for short. In the embodiments, the NWDAF may also be referred to as a network analysis function or a network analysis function network element. These have same meanings. Descriptions are uniformly provided herein.

The network repository function network element in this application is a network element that has a network element discovery function, and may be an NRF network element or another network element that has a similar function. For ease of description, in subsequent descriptions of this application, an example in which the network repository function network element is an NRF network element is used for description, and the NRF network element is referred to as an NRF for short.

Currently, 5G networks are designed to support three application scenarios, and the three application scenarios are as follows:

(1) Ultra-high bandwidth is supported, that is, enhanced mobile broadband (eMBB) applications are supported. For example, immersive video conference, ultra-multi-view display, and VR/AR interactive experience are supported.

(2) Massive connections are supported, that is, massive machine-type communications (mMTC) applications are supported. For example, smart metering, intelligent environment management, and wearable sensors are supported.

(3) High reliability and an ultra-low latency are supported, that is, ultra-reliable low-latency communication (URLLC) applications are supported. For example, autonomous driving and remote control of machines are supported.

For the URLLC applications, network quality is critical and directly affects production security. The autonomous driving is used as an example. For example, the autonomous driving may be classified into the following levels:

Level 0: A driver performs all driving operations.

Level 1: A driving assistance system performs any related driving operation, for example, traveling forward/backward, or turning left/right.

Level 2: A partially autonomous driving system performs related operations, for example, traveling forward/backward, or turning left/right, at the same time.

Level 3: A conditionally autonomous driving system performs all driving operations (in a limited area) and a driver is expected to make an action if necessary.

Level 4: A highly autonomous driving system performs all driving operations (in a limited area) and a driver is not expected to make an action.

Level 5: A fully autonomous driving system performs all driving operations (in all areas) and a driver is not expected to make an action.

Figure 2:
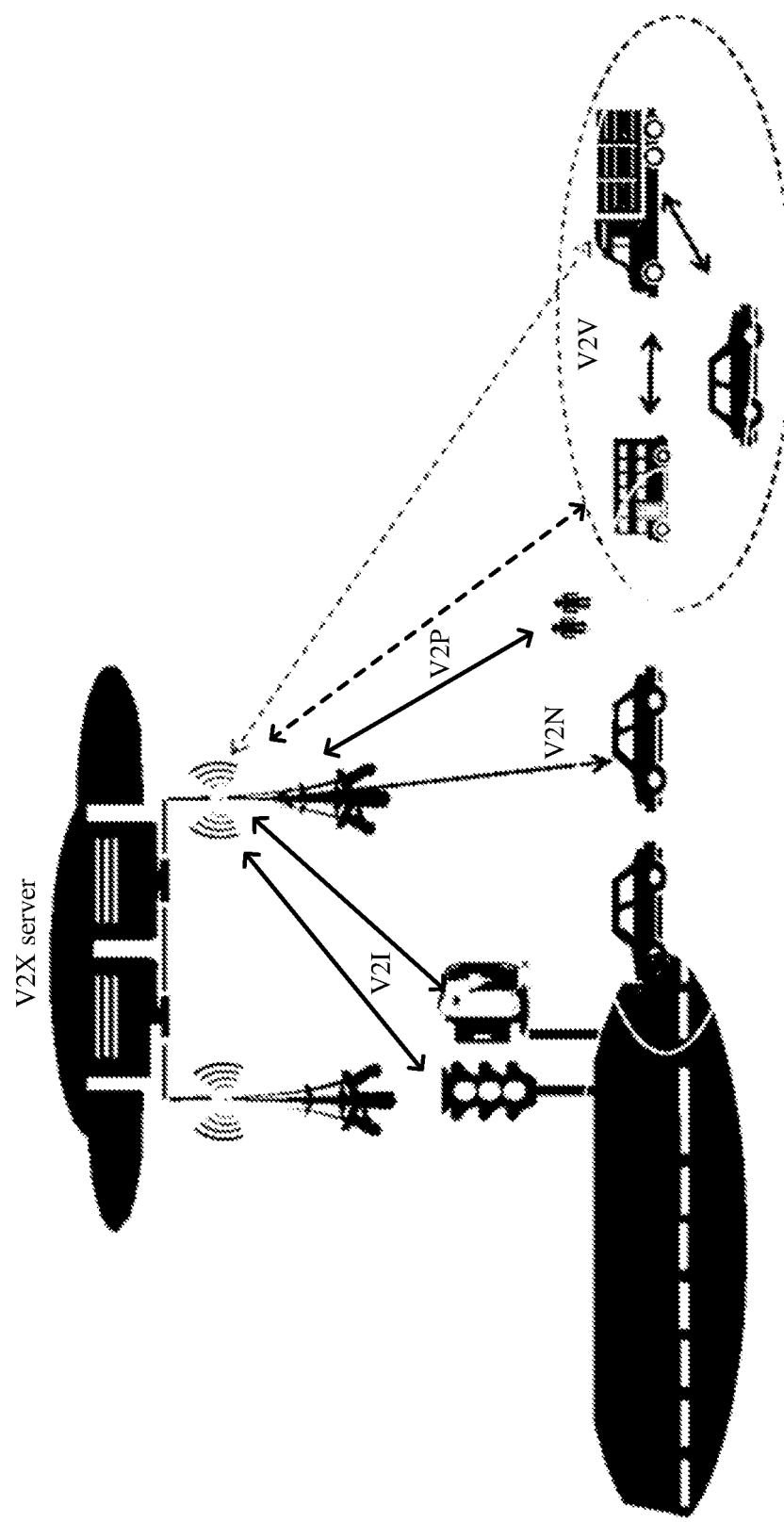
FIG. 2 is a schematic diagram of V2X.

The autonomous driving is based on vehicle-to-everything (V2X). FIG. 2 is a schematic diagram of V2X. V2X includes vehicle-to-vehicle (V2V) communication, vehicle-to-infrastructure (V2I) communication, vehicle-to-network (V2N) communication, and vehicle-to-pedestrian (V2P) communication, and is related to real-time communication of value-added applications such as road safety, traffic efficiency, and an intelligent traffic system. Based on V2X communication, a vehicle may exchange data with a surrounding environment, vehicles may interact with each other, a vehicle may interact with portable UE carried by a pedestrian, or a vehicle may interact with a surrounding infrastructure such as a traffic light in a specific range. The vehicle may obtain a series of information such as a real-time road condition, road information, and pedestrian information through the interaction, and perform a corresponding prompt/corresponding control on a driving process based on an actual situation, for example, a collision warning ahead, a crossroad giving way, a special vehicle giving way, and a traffic congestion prompt, to improve road safety and traffic efficiency.

The V2X communication requires high reliability and an ultra-low latency, and is carried on a mobile communication network, such as a 5G network. As a control entity of an entire autonomous driving process, a V2X server needs to learn of network performance in real time, to determine whether current network quality can support proceeding of autonomous driving.

For example, in a network with normal performance, the vehicle in FIG. 2 is in a level 4 autonomous driving state. When the vehicle is to travel to a network congested (or faulty) area, the V2X server needs to adjust the automatic autonomous state of the vehicle to manual driving. Therefore, a solution needs to be provided to notify the V2X server (or other AFs, such as servers for smart manufacturing and remote surgery applications) of current at least cell-level network performance information in real time, so that the V2X server can dynamically adjust the autonomous driving level of the vehicle based on the network performance, to ensure safety and production.

As indicated in the background, the NWDAF may obtain data from the NF and the OAM, and provide a result for the AF (for example, the V2X server) for use after performing analysis and processing. The data analyzed by the NWDAF is obtained from the NF and the OAM system. The data, however, is not the latest real-time data and cannot reflect current network performance.

To resolve the foregoing problem, the embodiments provide a network performance reporting method. In the method, network data can be obtained in real time, and at least cell-level network performance information or network performance prediction information can be provided to the AF.

Figure 3:
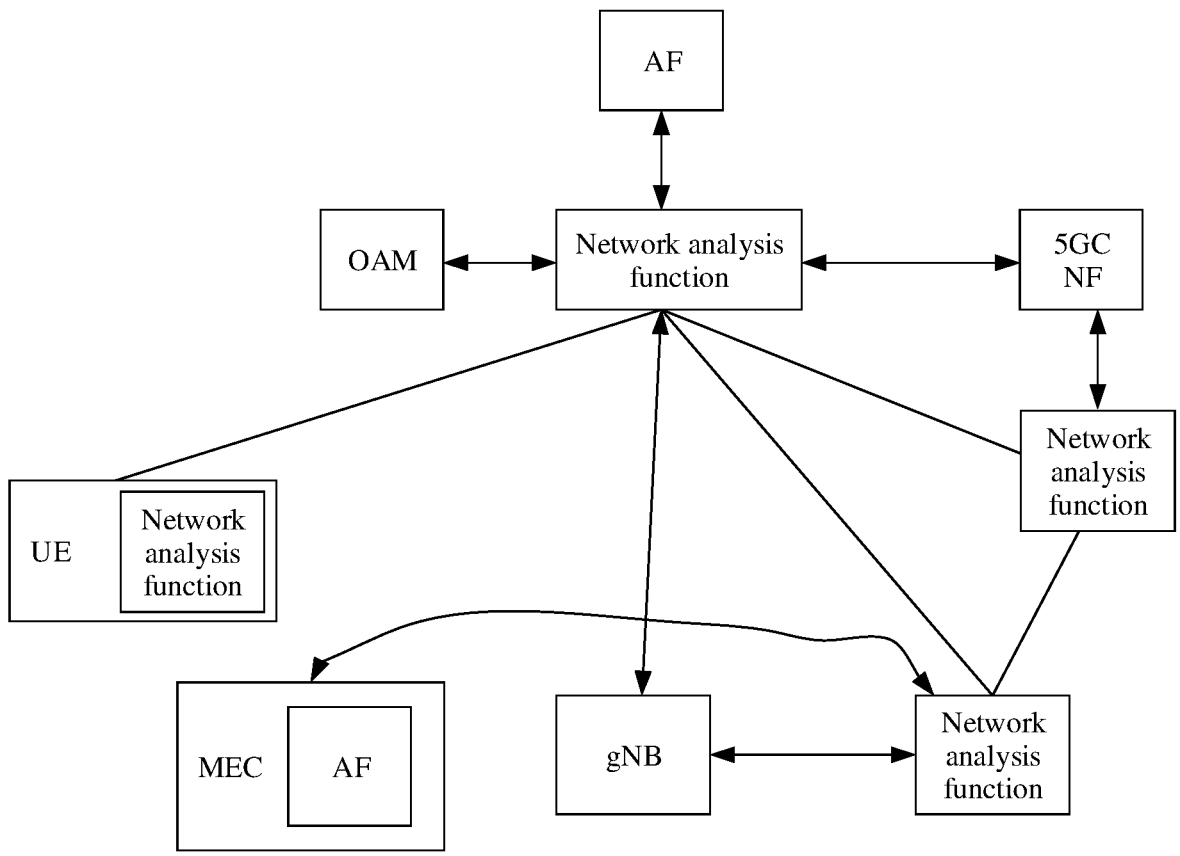
FIG. 3 shows a deployment manner of a network analysis function according to the embodiments.
Figure 4:
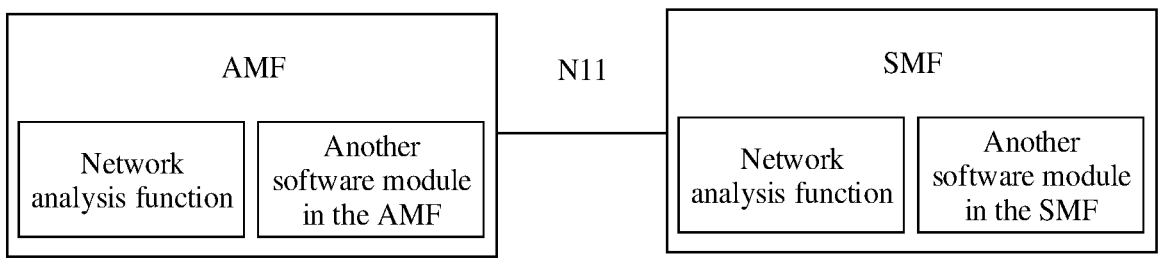
FIG. 4 shows an example of deployment of a network analysis function on an AMF side and an SMF side.

Based on the network architectures shown in FIG. 1A to FIG. 1C, as shown in FIG. 3, this application provides a deployment manner of a network analysis function (namely, an NWDAF). The network analysis function may be implemented in a distributed manner, and a distributed entity may be deployed on a 5GC NF side or a RAN side (for example, a RAN device is a gNB in the figure), or inside UE. When being deployed on the 5GC NF/gNB side, the distributed entity can be embedded in the 5GC NF/gNB as a software module. Interaction interfaces exist between distributed entities of the network analysis function. FIG. 4 shows an example of deployment of a network analysis function on an AMF side and an SMF side. During actual deployment, the network analysis function may be an independent physical device, an independent virtual device, a software module deployed in an AMF/SMF, or an independent software module deployed close to an AMF or an SMF in terms of a physical location or a network location.

The network analysis function can interact with the 5GC NF, the gNB, and the OAM to obtain information, obtain information from UE, and provide analysis results to the AFs, including AFs at a central side and distributed AF entities deployed at mobile edge computing (MEC).

It should be noted that the figure provides only one implementation, and during actual application, there may also be another deployment manner, for example, only one network analysis function is deployed (for example, deployed in a central location).

Figure 5:
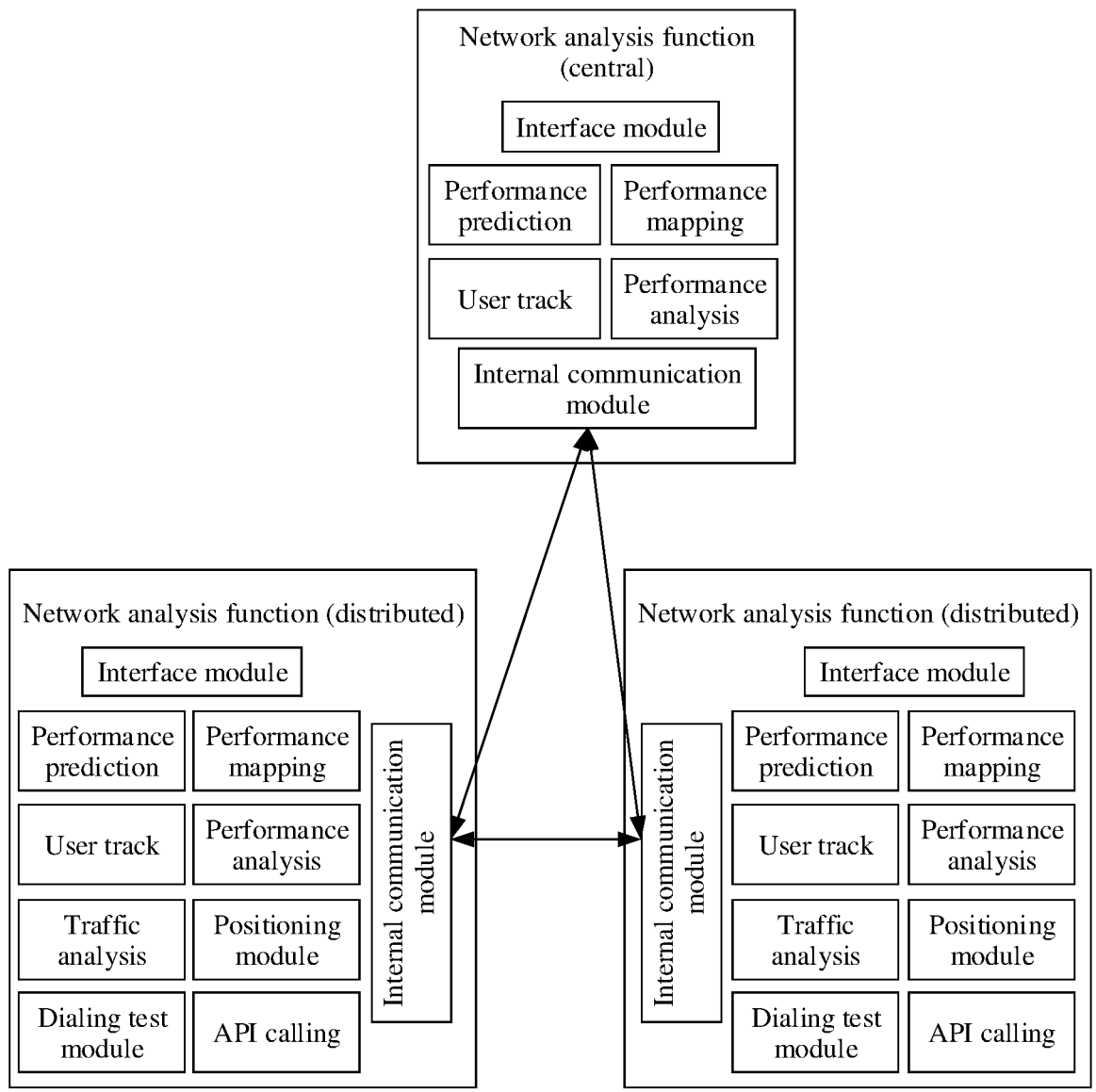
FIG. 5 is an example diagram of an internal function module of a network analysis function according to the embodiments.

FIG. 5 is an example diagram of an internal function module of a network analysis function according to the embodiments. It should be noted that the figure shows only one possible implementation method. During actual application deployment, the internal function module may be defined as required.

The network analysis function includes a central network analysis function and a distributed network analysis function. The central network analysis function includes an interface module, a performance prediction module, a performance mapping module, a user track module, a performance analysis module, and an internal communication module. The distributed network analysis function includes an interface module, a performance prediction module, a performance mapping module, a user track module, a performance analysis module, a traffic parsing module, a positioning module, an application programming interface (API) calling module, a dialing test module, and an internal communication module. Definitions of the foregoing functional modules are described in Table 1.

TABLE 1

| Module | Function |
|---|---|
| Interface module | Used to interact with an AF, 5GC NFs, OAM, or a RAN: 1. receive subscription from the AF, and send a result to the AF; and 2. subscribe to data from the 5GC NFs, the OAM, or the RAN and receive the result. |
| Internal communication module | Perform information exchange between distributed entities of the network analysis function. |
| Traffic parsing module | Used only for a distributed entity of the network analysis function: receive network traffic from 5GC NFs or a RAN, and obtain network performance parameter information through parsing. |
| Positioning module | Used only for a distributed entity of the network analysis function: perform positioning processing on UE based on data collected from a RAN, and obtain longitude and latitude information or location information of the UE. Alternatively, the positioning module may be a system/function independent of the network analysis function, and the network analysis function obtains precise location information of the UE from the network positioning function/system. |
| User track module | Draw and predict a moving track of UE based on a change of a location (a cell, a longitude, and a latitude) of the UE. |
| Performance analysis module | Analyze obtained network performance information, and determine whether to notify an AF. |
| Performance | Predict network performance of an area at a future time point or in a future |

TABLE 1-continued

| Module | Function |
| --- | --- |
| prediction module | time period. |
| Performance mapping module | Map a complex network performance parameter to a network performance level predefined with an AF or NFs. |
| Dialing test module | Used only for a distributed entity that is of the network analysis function and that is deployed on UE, and used to collect data on the UE side through a dialing test. |
| API calling module | Used only for a distributed entity that is of the network analysis function and that is deployed on UE, and used to collect data on the UE side by calling a system API. |

Figure 6A:
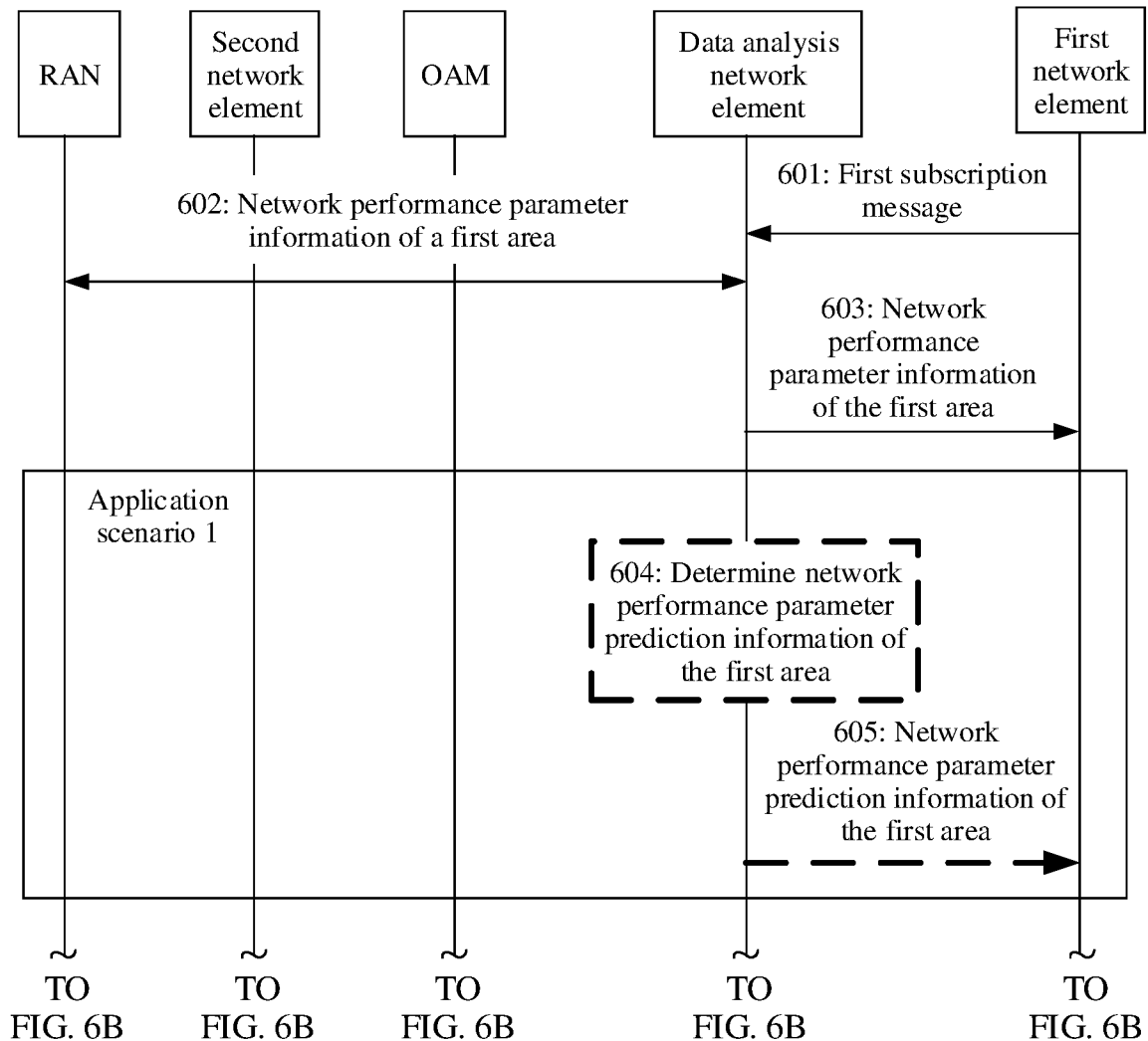
FIG. 6A and FIG. 6B are a schematic flowchart of a network performance reporting method according to the embodiments.
Figure 6B:
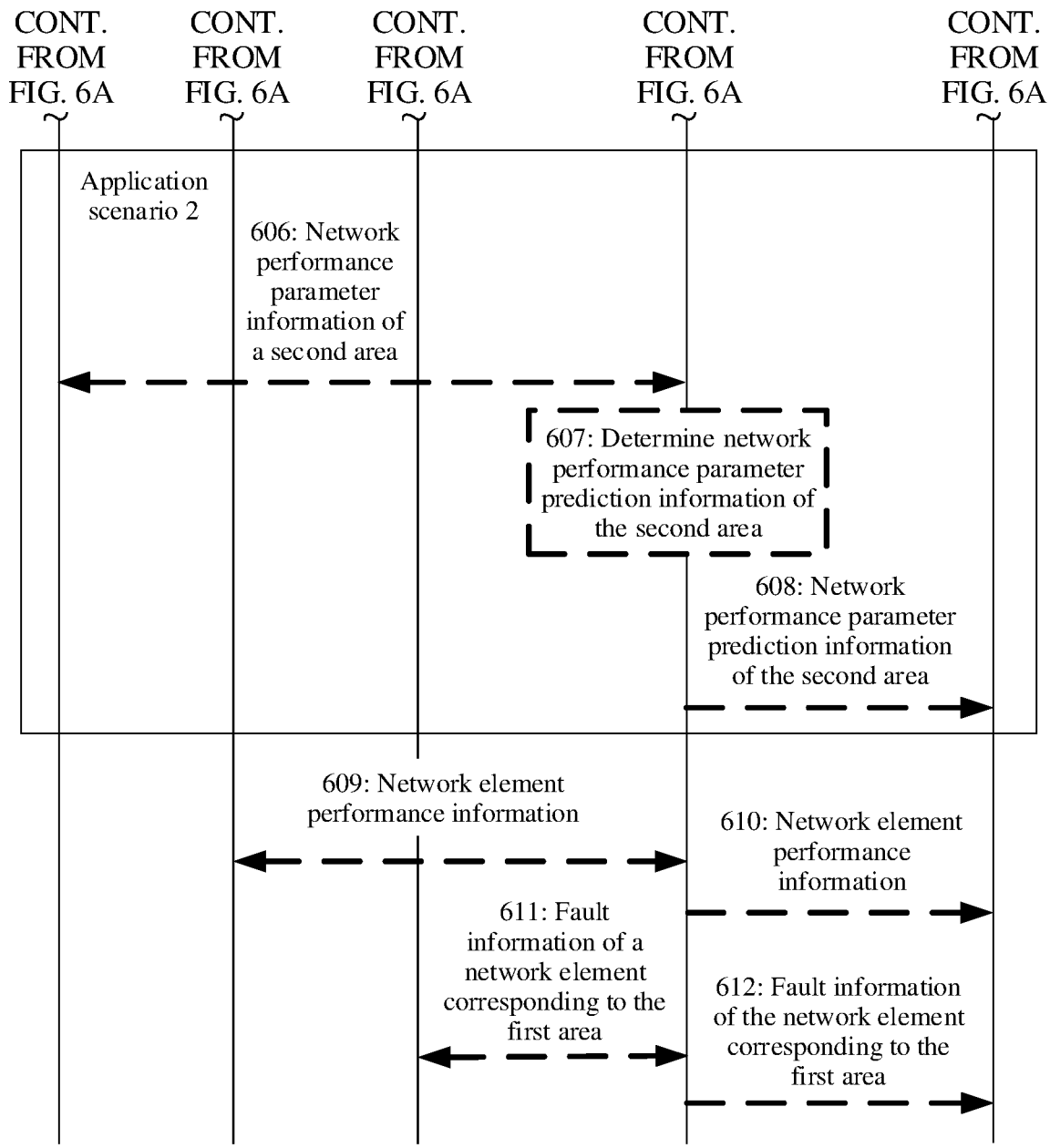

The following describes the network performance reporting method provided in the embodiments. FIG. 6A and FIG. 6B are a schematic flowchart of a network performance reporting method according to the embodiments.

The method includes the following steps.

Step 601: A first network element sends a first subscription message to a data analysis network element.

The first network element herein may be an AF, NFs, or an AF and NFs.

The first subscription message is used to request to subscribe to network performance parameter information of a first area.

The network performance parameter information is collected by a RAN, and can be used to measure availability of network quality to the AF, or be used when the NFs perform admission control, generate a load balancing policy, select a network function, or perform QoS control. The network performance parameter information corresponds to a group of network performance parameters and corresponding values. A specific network performance parameter to be used may be selected and defined as required.

In an implementation, a mapping relationship between a network performance level (for example, good, normal, or bad) and the network performance parameter information may be predefined between the data analysis network element and the first network element. In addition, the data analysis network element is responsible for completing mapping between the network performance parameter information and the network performance level, to shield the first network element from complexity of the network performance parameter information. A mapping relationship between the network performance level and the network performance parameter can be configured by the OAM in a network analysis function.

A granularity of the network performance parameter information may be a cell, a tracking area, a network slice instance, a network slice subnet instance, a network slice identifier, or the like.

Based on the subscription manner, when a first reporting condition is met, the data analysis network element sends the obtained network performance parameter information of the first area to the first network element. Subsequently, the first reporting condition herein is described for different scenarios.

Step 602: The data analysis network element obtains the network performance parameter information of the first area from a RAN corresponding to the first area.

The network performance parameter information of the first area is used to indicate network performance of the first area.

The network performance parameter information of the first area herein includes the network performance parameter and the corresponding value. The network performance parameter includes one or more of the following: a quantity of radio resource control (RRC) connections, a quantity of protocol data unit (PDU) sessions, physical resource block (PRB) utilization, a handover success rate, a handover failure rate, device-to-device (D2D) resource utilization, Uu interface resource utilization, physical downlink control channel (PDCCH) congestion, a random access channel (RACH) success rate, a RACH failure rate, and an air interface delay.

For step 602, in a possible implementation method, the network performance parameter information may be obtained from the RAN through subscription. That is, step 602 may include the following step 6021 and step 6022.

Step 6021: The data analysis network element sends a second subscription message to the RAN corresponding to the first area, where the second subscription message is used to request to subscribe to the network performance parameter information of the first area.

Step 6022: The data analysis network element receives the network performance parameter information of the first area from the RAN corresponding to the first area, where the network performance parameter information of the first area is sent when a second reporting condition is met.

The second reporting condition herein includes one or both of the following: a reporting periodicity arrives, and the network performance parameter information of the first area that is subscribed by the data analysis network element reaches a first threshold.

That the network performance parameter information of the first area that is subscribed by the data analysis network element reaches a first threshold element that the network performance parameter information of the first area that is subscribed by the data analysis network element falls to the first threshold or below the first threshold, or the network performance parameter information subscribed by the data analysis network element restores to the first threshold or above the first threshold.

Step 603: When determining that the first reporting condition is met, the data analysis network element sends the network performance parameter information of the first area to the first network element.

In an alternative implementation of step 603, to shield complexity of the network performance parameter information, the data analysis network element may alternatively send, to the first network element, a network performance level corresponding to the network performance parameter information of the first area, where the network performance level is used to indicate quality of the network performance of the first area.

Based on the foregoing implementation solution, the first network element (for example, the AF and the NFs) may subscribe to the network performance parameter information from the data analysis network element, and after obtaining the network performance parameter information from the RAN, the data analysis network element may report the network performance parameter information to the first network element. Because the network performance parameter information obtained from the RAN can more accurately reflect real-time performance of a cell, the first network element can perform more precise control or application.

The foregoing solution is described below with reference to two application scenarios.

In an application scenario 1, the first area in step 601 includes one or more cells, and the first subscription message includes one or more cell identities (cell IDs). Alternatively, the first area includes one or more tracking areas (TAs), and the first subscription message includes one or more tracking area identities (TAIs).

In other words, the first subscription message in step 601 carries the one or more cell identities, and the first subscription message is used to request network performance parameter information of the one or more cells. Alternatively, the first subscription message carries the one or more tracking area identities, and the first subscription message is used to subscribe to network performance parameter information of the one or more tracking areas.

Based on the application scenario, the first reporting condition in step 603 may be, for example, one or both of the following: the network performance parameter information subscribed by the first network element reaches a second threshold (that is, if a value of a network performance parameter reaches the second threshold, the network performance parameter information is reported), and the data analysis network element obtains the network performance parameter information of the first area for the first time.

That the network performance parameter information of the first area that is subscribed by the first network element reaches a second threshold element that the network performance parameter information of the first area that is subscribed by the first network element falls to the second threshold or below the second threshold, or the network performance parameter information subscribed by the first network element restores to the second threshold or above the second threshold.

Based on the application scenario, the first subscription message in step 601 may be further used to request to subscribe to network performance parameter prediction information of the first area, and the following step 604 and step 605 may be further included.

Step 604: The data analysis network element determines the network performance parameter prediction information of the first area based on the network performance parameter information of the first area and historical network performance parameter information of the first area.

The historical network performance parameter information of the first area refers to network performance parameter information of the first area that is obtained from the RAN in a historical time period in the same manner as that in step 602.

The network performance parameter prediction information of the first area may be prediction information at a specific future time point (for example, the specific time point is carried in the first subscription message), or may be prediction information in a time period (for example, the time period is carried in the first subscription message) after a current moment.

Step 605: When determining that a third reporting condition is met, the data analysis network element sends the network performance parameter prediction information of the first area to the first network element.

In an implementation, the third reporting condition herein may include one or both of the following: the network performance parameter prediction information of the first area that is subscribed by the first network element reaches a third threshold, and the data analysis network element obtains the network performance parameter prediction information of the first area for the first time.

That the network performance parameter prediction information of the first area that is subscribed by the first network element reaches a third threshold element that the network performance parameter prediction information of the first area that is subscribed by the first network element falls to the third threshold or below the third threshold, or the network performance parameter prediction information subscribed by the first network element restores to the third threshold or above the third threshold.

Based on the foregoing step 604 and step 605, the first network element may obtain the network performance parameter prediction information of the first area from the data analysis network element, to help the first network element implement more precise control or application.

It should be noted that there is no strict execution sequence between step 604, step 605, and step 603. For example, step 603 may be performed before step 604, or may be performed between step 604 and step 605, or may be performed after step 605.

In another implementation, step 603 and step 605 may be combined into one step, and the step is performed after step 604.

In still another implementation, when the first subscription message is only used to request to obtain the network performance parameter prediction information of the first area, the foregoing step 603 may not be performed, that is, step 601 and step 602, and step 604 and step 605 are performed.

In an application scenario 2, the first subscription message in step 601 includes an identifier of UE, and the first area is a cell in which the UE is located.

In other words, the first subscription message in step 601 carries the ID of the UE, and the first subscription message is used to request network performance parameter information of the cell in which the UE is located.

Based on the application scenario, the first reporting condition in step 603 may be, for example, one or more of the following: the UE enters the first area, network performance information of the first area in which the UE is currently located has not been reported, and the network performance parameter information of the first area that is subscribed by the first network element reaches a fourth threshold.

That the network performance parameter information of the first area that is subscribed by the first network element reaches the fourth threshold element that the network performance parameter information of the first area that is subscribed by the first network element falls to the fourth threshold or below the fourth threshold, or the network performance parameter information subscribed by the first network element restores to the fourth threshold or above the fourth threshold.

In an implementation method, a method for determining the first area by the data analysis network element is as follows: the data analysis network element sends a subscription message to all RANs in a network, and subscribes to change information of a cell of the UE. After receiving the subscription message, if the UE is in an area covered by a RAN, the RAN sends a message to the data analysis network element to notify of the cell in which the UE is located. Subsequently, if the cell in which the UE is located changes, the RAN may immediately notify the data analysis network element of the cell in which the UE is located, or periodically notify the data analysis network element of the cell in which the UE is located. If the UE is not originally in the area covered by the RAN but then enters the area, the RAN also needs to notify the data analysis network element of the cell in which the UE is located.

Based on the application scenario, the first subscription message in step 601 may be further used to request to subscribe to network performance parameter prediction information of a second area, and the second area is a next cell that the UE is to enter. After step 603, the following step 606 to step 608 may be further included.

Step 606: The data analysis network element obtains network performance parameter information of the second area from a RAN corresponding to the second area, where the network performance parameter information of the second area is used to indicate network performance of the second area.

It should be noted that the RAN corresponding to the second area herein and the RAN corresponding to the first area in step 602 may be a same RAN, or may be different RANs. For example, when the RAN corresponding to the first area can provide a service for the second area, the RAN corresponding to the first area and the RAN corresponding to the second area may be a same RAN.

In an implementation, in this step, the network performance parameter information of the second area may be alternatively obtained from the RAN corresponding to the second area in a subscription manner similar to that in the foregoing step 602. In addition, when a specific reporting condition is met, the RAN reports the network performance parameter information of the second area to the data analysis network element. For details, refer to the foregoing descriptions of step 6021 and step 6022.

Step 607: The data analysis network element determines the network performance parameter prediction information of the second area based on the network performance parameter information of the second area and historical network performance parameter information of the second area.

The historical network performance parameter information of the second area refers to network performance parameter information of the second area that is obtained from the RAN in a historical time period in the same manner as that in step 606.

The network performance parameter prediction information of the second area may be prediction information at a specific future time point (for example, the specific time point is carried in the first subscription message, or the first subscription message indicates a time point that is predicted by the data analysis network element and at which the UE is to enter the second area), or may be prediction information in a time period (for example, the time period is carried in the first subscription message) after a current moment.

Step 608: When determining that a fourth reporting condition is met, the data analysis network element sends the network performance parameter prediction information of the second area to the first network element.

In an implementation, the fourth reporting condition herein may include one or both of the following: the data analysis network element determines that the UE is to enter the second area, and the network performance parameter prediction information of the second area that is subscribed by the first network element reaches a fifth threshold.

That the network performance parameter prediction information of the second area that is subscribed by the first network element reaches a fifth threshold element that the network performance parameter prediction information of the second area that is subscribed by the first network element falls to the fifth threshold or below the fifth threshold, or the network performance parameter prediction information of the second area that is subscribed by the first network element restores to the fifth threshold or above the fifth threshold.

Based on the foregoing step 606 to step 608, the first network element may obtain the network performance parameter prediction information of the second area from the data analysis network element, to help the first network element implement more precise control or application.

In an implementation, when the RAN corresponding to the first area and the RAN corresponding to the second area are a same RAN, step 602 and step 606 may be combined into one step, and step 603 and step 608 may also be combined into one step.

In another implementation, when the first subscription message is only used to request to obtain the network performance parameter prediction information of the second area, the foregoing step 602 and step 603 may not be performed, that is, step 601, and step 606 to step 608 are performed.

For the foregoing application scenario 2, the following provides different implementation methods for determining, by the data analysis network element, that the UE is to enter the second area.

In an implementation method 1, the data analysis network element obtains location information of the UE from the RAN corresponding to the first area. The location information of the UE is information about the first area. The data analysis network element determines a moving track of the UE based on the location information of the UE and historical location information of the UE. The moving track is used to indicate a moving direction of the UE and locations passed by the UE when the UE moves. Optionally, the moving track is also used to indicate a moving speed of the UE. The data analysis network element determines, based on the moving track and a network topology structure, information about the second area that the UE is to enter. The network topology structure is used to indicate distribution locations of cells in a network, and the cells include the first area and the second area.

That is, the data analysis network element obtains current location information of the UE, and determines the moving track of the UE based on the current location information of the UE and previously obtained historical location information of the UE, to determine, based on the moving track and the network topology structure, information about the next cell that the UE is to enter, namely, information about the second area in this application.

The "moving track of the UE" herein refers to a list of cells passed by the UE when the UE moves.

In this implementation method, the information about the next cell that the UE is to enter may be predicted at a cell granularity.

In an implementation method, the data analysis network element may obtain the location information of the UE from the RAN corresponding to the first area by using the following method: the data analysis network element sends a third subscription message to the RAN corresponding to the first area, where the third subscription message is used to request to subscribe to the location information of the UE. When a fifth reporting condition is met, the RAN sends the location information of the UE to the data analysis network element, where the fifth reporting condition includes one or both of the following: A location of the UE changes, and a reporting periodicity arrives.

In an implementation method 2, the data analysis network element obtains a measurement report (MR) of the UE from the RAN corresponding to the first area. The data analysis network element determines longitude and latitude information of the UE based on the measurement report of the UE. The data analysis network element determines a moving track of the UE based on the longitude and latitude information of the UE and the longitude and latitude information of the UE. The moving track is used to indicate a moving direction of the UE and locations passed by the UE when the UE moves. Optionally, the moving track is also used to indicate a moving speed of the UE. The data analysis network element determines, based on the moving track and a network topology structure, the second area that the UE is to enter. The network topology structure is used to indicate distribution locations of cells in a network, and the cells include the first area and the second area.

That is, the data analysis network element obtains the measurement report of the UE, determines the longitude and latitude information of the UE, and determines the moving track of the UE based on the longitude and latitude information of the UE and previously obtained historical longitude and latitude information of the UE, to determine, based on the moving track and the network topology structure, information about the next cell that the UE is to enter, namely, information about the second area in this application.

In this implementation method, the information about the next cell that the UE is to enter may be predicted at a granularity of longitude and latitude. Compared with the foregoing implementation method 1, more precise prediction can be provided in this implementation method.

In an implementation method, the data analysis network element may obtain the measurement report of the UE from the RAN corresponding to the first area by using the following method: The data analysis network element sends a fourth subscription message to the RAN corresponding to the first area, where the fourth subscription message is used to request to subscribe to the measurement report of the UE. When a sixth reporting condition is met, the RAN sends the measurement report of the UE to the data analysis network element, where the sixth reporting condition includes one or both of the following: The RAN corresponding to the first area receives the measurement report of the UE, and a reporting periodicity arrives.

In an implementation method, the measurement report of the UE includes one or more of the following: RSRP), RSRQ), a SINR), a throughput of the UE, and CSI).

Based on the implementation method 1 or the implementation method 2, the data analysis network element may determine the location information or the longitude and latitude information of the UE by subscribing to the location information or the measurement report of the UE from the RAN, and further may draw the moving track of the UE and predict, based on the moving track, the information about the next cell that the UE is to enter. Further, the data analysis network element may predict the moving direction and the moving speed of the UE, and then may predict time of entering the next cell.

Based on the foregoing solution, in an implementation method, the following step 609 and step 610 may be further included after the foregoing solution (for example, the solution of step 601 to step 603, the solution of step 601 to step 605, or the solution of step 601 to step 603, and step 606 to step 608).

Step 609: The data analysis network element obtains network element performance information from a second network element corresponding to the first area, where the network element performance information is used to indicate performance of the second network element, and the first subscription message in step 601 is also used to subscribe to network element performance information of a network element corresponding to the first area.

The data analysis network element may determine a correspondence between an area and a network element based on the network topology structure or service scopes of network elements (including the second network element) obtained from the OAM.

In an implementation method, the data analysis network element may obtain the network element performance information of the second network element from the second network element by using the following method: the data analysis network element sends a subscription message to the second network element, where the subscription message is used to request to subscribe to the network element performance information. When a reporting condition is met, the second network element sends the network element performance information to the data analysis network element. The reporting condition includes one or both of the following: A reporting periodicity arrives, and network performance information of the second network element that is subscribed by the data analysis network element reaches a threshold.

The network element performance information herein includes one or more of the following: load of a network element, a throughput of the network element, and a quantity of users of the network element.

Step 610: The data analysis network element sends the network element performance information of the first area to the first network element.

Additionally, if a network element corresponding to the second area is not the second network element, for example, a third network element, the data analysis network element may further obtain network element performance information of the third network element corresponding to the second area, and send the network element performance information to the first network element.

According to the foregoing step 609 and step 610, the data analysis network element may send, to the first network element, network element performance information that is of a network element corresponding to a specific area and that is subscribed by the first network element, so that the first network element may determine, with reference to network element performance and network performance parameter information, a network condition that can be provided in the area. This helps the first network element implement precise control or application.

Based on the foregoing solution, in an implementation method, the following step 611 and step 612 may be further included after the foregoing solution (for example, the solution of step 601 to step 603, the solution of step 601 to step 605, or the solution of step 601 to step 603, and step 606 to step 608).

Step 611: The data analysis network element obtains fault information of a network element corresponding to the first area from the OAM system corresponding to the first area.

The network element corresponding to the first area herein refers to the second network element. Further, the data analysis network element can also subscribe to fault information of a network element corresponding to another area from the OAM system.

In an implementation method, the data analysis network element may obtain, from the OAM system, the fault information of the network element corresponding to the first area by using the following method: the data analysis network element sends a subscription message to the OAM system, where the subscription message is used to request to subscribe to the fault information of the network element corresponding to the first area. When a reporting condition is met, the OAM system sends the fault information of the network element corresponding to the first area to the data analysis network element, where the reporting condition may be that a fault alarm occurs on the network element corresponding to the first area.

Step 612: The data analysis network element sends the fault information of the network element corresponding to the first area to the first network element.

Further, if a network element corresponding to the second area is not the second network element, for example, a third network element, the data analysis network element may further obtain fault information of the third network element corresponding to the second area, and send the fault information to the first network element.

According to the foregoing step 611 and step 612, the data analysis network element may send, to the first network element, fault information that is of a network element corresponding to a specific area and that is subscribed by the first network element, so that the first network element may determine, with reference to the fault information of the network element and network performance parameter information, a network condition that can be provided in the area. This helps the first network element implement precise control or application.

It should be noted that any one of the foregoing solutions (for example, the solution of step 601 to step 603, the solution of step 601 to step 605, or the solution of step 601 to step 603, and step 606 to step 608) may be combined with step 609 and step 610, may be combined with step 611 and step 612, or may be combined with step 609 and step 610, and step 611 and step 612.

It should be noted that setting methods and values of the various thresholds (the first threshold to the fifth threshold) in the foregoing solutions are not limited in this application. For example, the thresholds may be preconfigured, or notified by the first network element (for example, notified by using the first subscription message or another message).

The following provides a specific implementation method by using an example in which the data analysis network element is an NWDAF (which is also referred to as a network analysis function), the first network element is an AF/NFs, and the second network element is 5GC NFs. The data analysis network element includes a distributed network analysis function and a central network analysis function. The distributed network analysis function is used to subscribe to information about a network element corresponding to the distributed network analysis function.

Figure 7A:
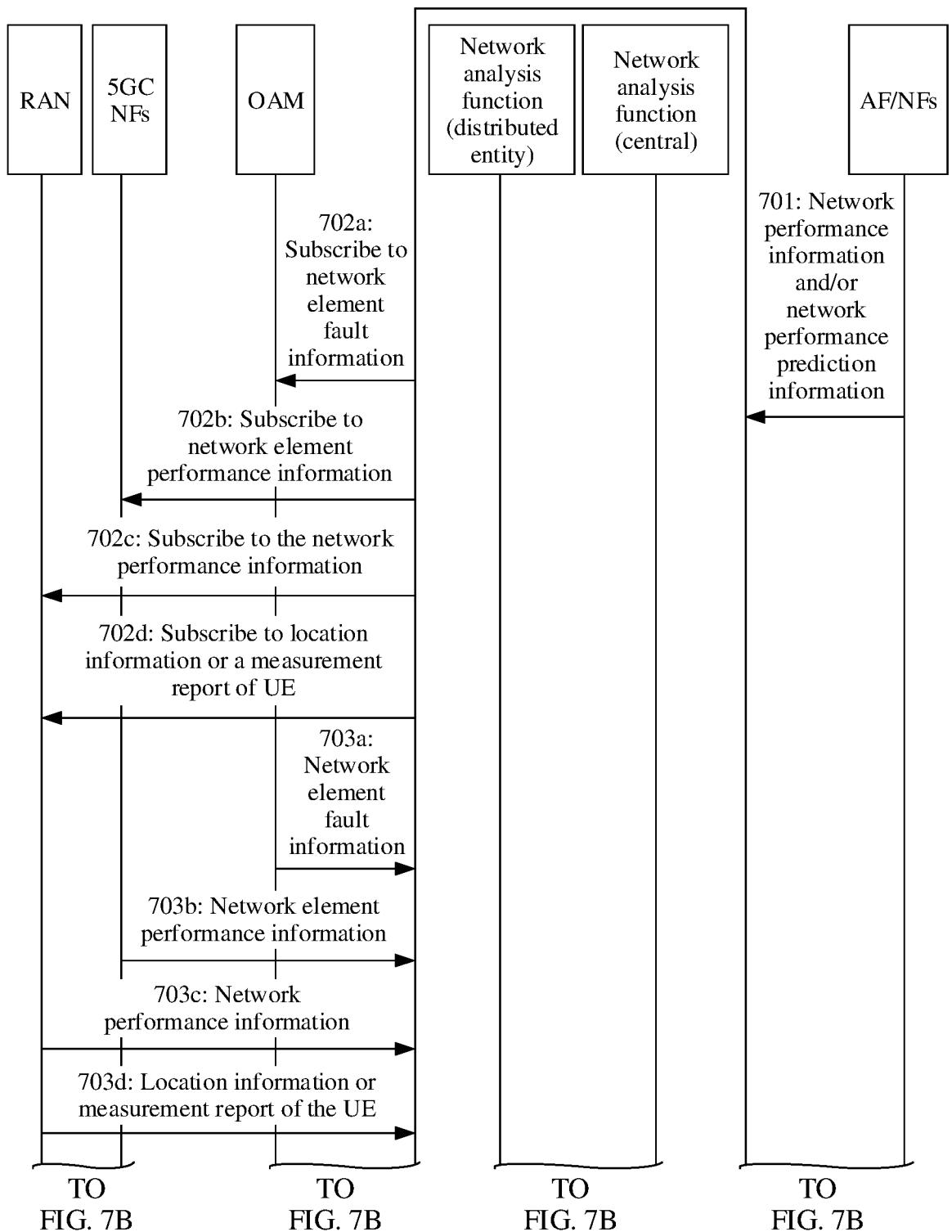
FIG. 7A and FIG. 7B are a schematic flowchart of another network performance reporting method according to the embodiments.
Figure 7B:
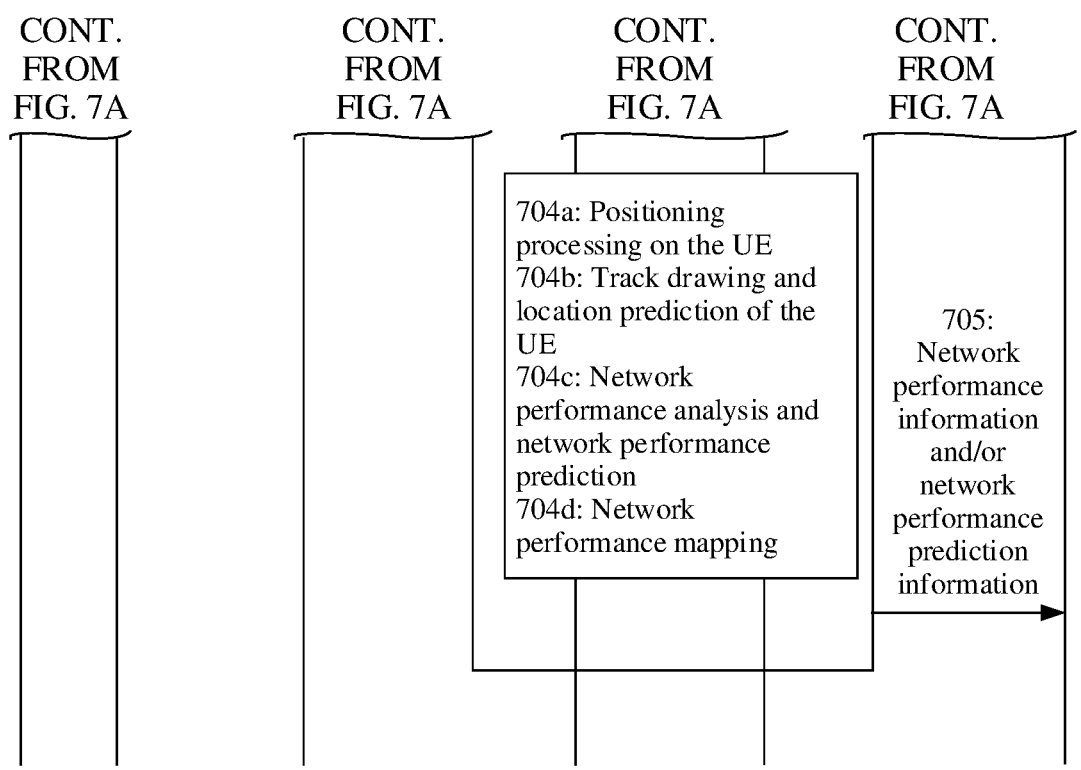

FIG. 7A and FIG. 7B are a schematic flowchart of another network performance reporting method according to this application. The method includes the following steps.

Step 701: An AF/NFs subscribes/subscribe to network performance information and/or network performance prediction information from a network analysis function.

The network performance information herein includes one or more of network performance parameter information obtained by a RAN, network element fault information obtained by OAM, and network element performance information obtained by 5GC NFs.

Step 702a: The network analysis function subscribes to the network element fault information from the OAM.

Network elements herein refer to the 5GC NFs (including but not limited to a UPF, an SMF, an AMF, a PCF, UDM, and an NRF) and the RAN.

The network element fault information herein refers to a fault alarm.

Step 702b: The network analysis function subscribes to the network element performance information from the 5GC NFs.

The 5GC NFs herein include but are not limited to the UPF, the SMF, the AMF, the PCF, the UDM, and the NRF.

Step 702c: The network analysis function subscribes to the network performance parameter information from the RAN or directly collects the network performance parameter information.

Step 702d: The network analysis function subscribes to location information and/or a measurement report of UE from the RAN.

In an alternative implementation, the network analysis function may alternatively subscribe to the location information of the UE from a network positioning system.

Step 703a: The OAM reports the network element fault information to the network analysis function.

A condition for triggering the reporting may be as follows: when a network element fault alarm occurs, the OAM reports the alarm to the network analysis function.

Step 703b: The 5GC NFs report the network element performance information to the network analysis function.

A condition for triggering the reporting may be one or both of the following:

Condition 1: Reporting is periodically performed, and the periodicity is definable.

Condition 2: A subscribed network performance parameter reaches or falls below a threshold, and the threshold is definable.

Step 703c: The RAN reports the network performance information to the network analysis function.

A condition for triggering the reporting may be one or both of the following:

Condition 1: Reporting is periodically performed, and the periodicity is definable.

Condition 2: A subscribed network performance parameter reaches or falls below a threshold, and the threshold is definable.

Step 703d: The RAN reports the location information or the measurement report of the UE to the network analysis function.

A condition for triggering the reporting may be one or both of the following:

Condition 1: The location information of the UE is periodically reported when the UE enters an area of the RAN for the first time and when a cell in which the UE is located changes.

Condition 2: The measurement report of the UE is reported when the RAN receives the measurement report from the UE.

Step 704a: The network analysis function performs positioning processing on the UE.

The network analysis function can directly obtain the location information of the UE, namely, information about the cell in which the UE is located. Further, if the network analysis function obtains the measurement report of the UE, the network analysis function determines longitude and latitude information of the UE based on the measurement report.

Step 704*b*: The network analysis function draws a moving track of the UE and predicts a location of the UE.

The network analysis function can draw the moving track of the UE at a cell granularity or a longitude/latitude granularity based on historical location information (a cell, or a longitude/latitude) of the UE and the location information of the UE. In addition, the network analysis function can also obtain a moving direction and speed of the UE.

The predicted moving direction and speed of the UE may be represented as: a predicted next cell that the UE is to enter and a predicted time point at which the UE is to enter. If the network analysis function has not subscribed to network performance parameter information of the "next cell" from the RAN, the network analysis function needs to subscribe to the network performance parameter information of the cell from the RAN.

Step 704*c*: The network analysis function performs network performance analysis and network performance prediction.

The network analysis function performs the network performance analysis based on data received from the OAM, the 5GC NFs, and the RAN, and operations performed include one or more of the following:

(1) determining, based on the fault alarm of the OAM and the network element performance information of the 5GC NFs, whether the RAN and the 5GC NFs that provide services in a subscription area can normally provide services;

(2) determining network performance of the subscription area based on the cell-granularity network performance parameter information subscribed from the RAN; and (3) determining network performance of a network slice instance or a network slice subnet instance based on the information in (1) and (2).

The network analysis function predicts, based on historical network performance parameter information, current network performance parameter information, and service statuses of the RAN and the 5GC NFs in the subscription area, network performance at a subsequent time point or in a subsequent time period.

Step 704*d*: The network analysis function performs network performance mapping.

The network analysis function maps an original network performance parameter to a network performance level (such as good, normal, and bad) according to a mapping rule predefined with the AF.

Step 705: The network analysis function reports the subscribed network performance information and/or network performance prediction information to the AF/NFs.

During specific implementation, if the network performance information is subscribed, the network performance information is reported; if the network performance prediction information is subscribed, the network performance prediction information is reported; or if the network performance information and network performance prediction information are subscribed, the network performance information and network performance prediction information are reported.

When network performance information and/or network performance prediction information of a specific area are/is subscribed in step 701, reporting may be triggered in one or both of the following manners:

(1) The network performance information and/or the network performance prediction information of the area are/is reported to the AF/NFs when the network performance information and/or the network performance prediction information of the area are/is obtained for the first time. Alternatively, when it is predicted that the UE is to enter one or more new cells, network performance information and/or network performance prediction information of the one or more cells are/is reported to the AF/NFs in advance.

(2) When the network performance information and/or the network performance prediction information of the area exceed or fall below/exceeds or falls below a threshold, the network performance information and/or the network performance prediction information are/is then reported to the AF/NFs.

When the network performance information of "an area corresponding to a moving track of UE (or a UE group)" is subscribed in step 701, reporting may be triggered in one or more of the following manners:

(1) Initially obtained network performance information of a cell in which the UE is located is reported to the AF/NFs.

(2) When the UE enters a new cell, network performance information of the cell is reported to the AF/NFs.

(3) Subsequently, when the UE stays in the cell, if network performance of the cell exceeds or falls below a threshold, the network performance is then reported to the AF/NFs, or is periodically reported to the AF/NFs.

When the network performance prediction information of "an area corresponding to a moving track of UE (or a UE group)" is subscribed in step 701, reporting may be triggered in one or more of the following manners:

(1) For a next cell that the UE is to enter, a time point of entering the next cell and network performance prediction information corresponding to the time point are reported.

(2) Subsequently, before the UE enters the "next cell", if the network performance prediction information of the cell exceeds or falls below a threshold, the changed network performance prediction information is then reported to the AF/NFs.

(3) Subsequently, if the predicted "next cell" changes, that is, a prediction result is corrected, a time point of entering a new "next cell" and network performance prediction information corresponding to the time point need to be reported to the AF/NFs.

The network analysis function reports the network performance information and/or the network performance prediction information of the subscribed network element to the NFs, and the network performance information and/or the network performance prediction information may be used by the NFs to perform admission control, generate a load balancing policy, select a network function, perform QoS control, or the like.

The network performance reporting method shown in FIG. 6A and FIG. 6B or FIG. 7A and FIG. 7B is described below with reference to further embodiments.

Figure 8:
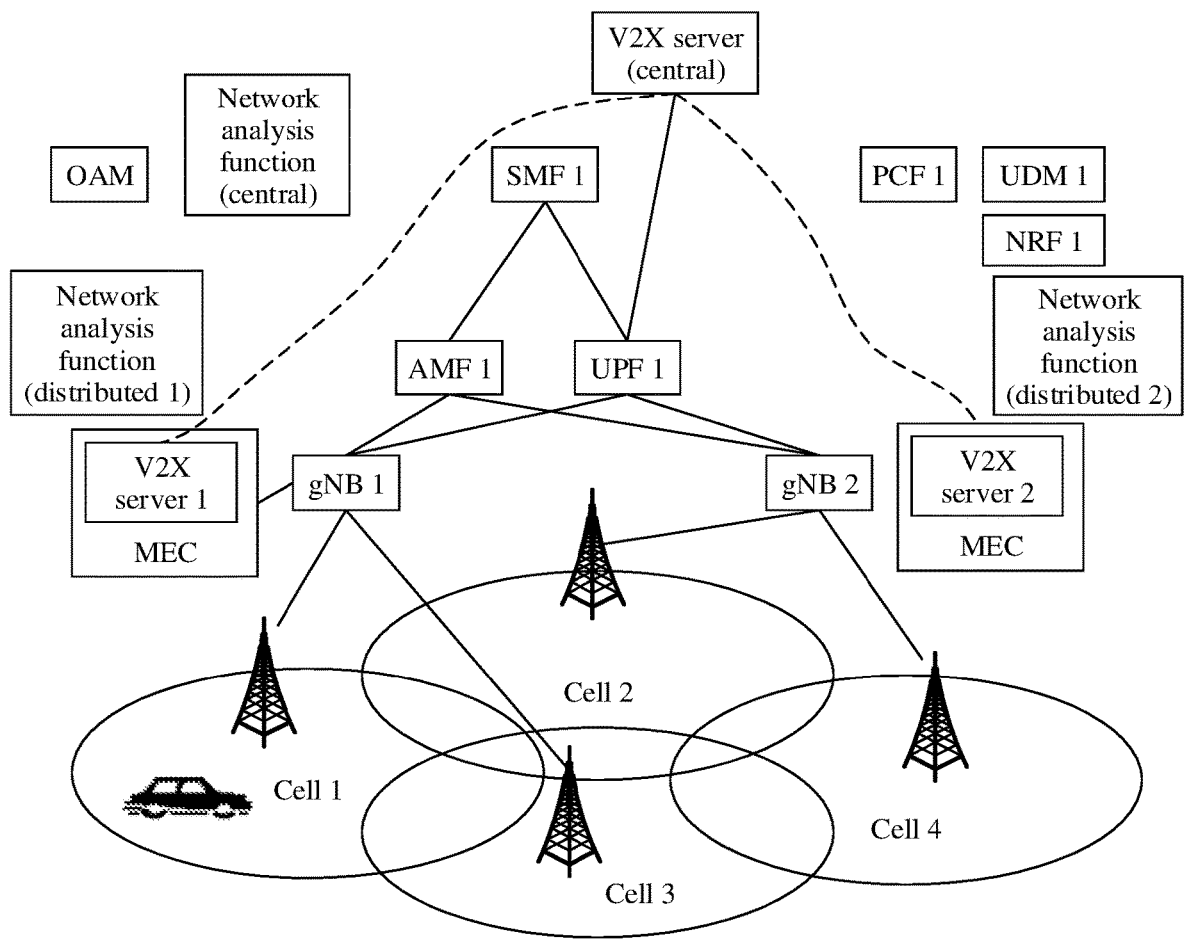
FIG. 8 is an example diagram of a scenario of network performance analysis according to the embodiments.

FIG. 8 is an example diagram of a scenario of network performance analysis according to the embodiments. In this example, real-time network performance information and network performance prediction information of a specific static area are provided to support V2X services in a campus. This campus has four cells, which are described as a cell 1, a cell 2, a cell 3, and a cell 4. Two RAN devices are described as a gNB 1 and a gNB 2. An AMF, an SMF, a UPF, a PCF, UDM, and an NRF are respectively described as an AMF 1, an SMF 1, a UPF 1, a PCF 1, UDM 1, and an NRF 1.

V2X servers are deployed in distributed mode, and include one central V2X server (central), and two remote distributed V2X servers, namely, a V2X server 1 and a V2X server 2.

Network analysis functions are deployed in distributed mode, and include one central "network analysis function (central)", and two remote distributed network analysis functions, namely, a "network analysis function (distributed 1)" and a "network analysis function (distributed 2)", which are respectively deployed close to the V2X server 1 and the V2X server 2.

The V2X server subscribes to the network performance information and the network performance prediction information of the area from the network analysis function. Steps are as follows:

Step 801: The central V2X server sends a subscription message to the central network analysis function.

An information element of the message includes:

(1) Data: [Network performance parameter 1, threshold], [network performance parameter 2, threshold], . . . , and [network performance parameter n, threshold], that is, the data is one or more network performance parameters and a threshold corresponding to each network performance parameter.

In another implementation method, the data in the information element may alternatively be [network performance level, threshold].

(2) Target area: Cell 1, cell 2, cell 3, and cell 4.

(3) Reporting mode: Reporting performed for initial subscription & (reporting triggered for a change exceeds a threshold, periodic reporting [reporting periodicity], or reporting based on prediction [time interval, reporting periodicity]).

(4) Reporting destination: [Central V2X server].

In another implementation method, the reporting destination in the information element may alternatively be [cell 1, cell 3 to V2X server 1] or [cell 2, cell 4 to V2X server 2].

The "threshold" is used to indicate to report a current value of the network performance parameter when corresponding network performance parameter information reaches the threshold.

The reporting performed for initial subscription refers to reporting when subscribed data is obtained for the first time.

The reporting triggered for a change exceeds a threshold refers to reporting when the corresponding network performance parameter information reaches the threshold. For example, when the network performance parameter falls to or below the threshold, or when network performance parameter prediction information restores to or above the threshold, reporting is performed.

The periodic reporting refers to reporting performed periodically.

The reporting based on prediction refers to reporting network performance parameter prediction information at a time point after a specified "time interval" based on the reporting periodicity.

The "&" indicates a parallel relationship.

Step 802: The central network analysis function sends a subscription message to the OAM.

An information element of the message includes:

(1) Data: Fault/alarm information.

(2) Target network elements: AMF 1, SMF 1, UPF 1, PCF 1, UDM 1, NRF 1, gNB 1, and gNB 2.

(3) Reporting mode: Reporting performed for initial subscription & reporting for an occurrence.

The reporting for an occurrence refers to reporting when an event (for example, a fault event) occurs.

Step 803: The central network analysis function sends a subscription message to the AMF 1, the SMF 1, the UPF 1, the PCF 1, the UDM 1, or the NRF 1.

An information element of the message includes:

(1) Data: [Network performance parameter 1—load, threshold], [network performance parameter 2—throughput, threshold], and [network performance parameter 3—quantity of users, threshold].

(2) Reporting mode: Reporting performed for initial subscription & (reporting triggered for a change exceeds a threshold or periodic reporting [reporting periodicity]).

That is, the reporting mode includes the reporting performed for initial subscription, and further includes the reporting triggered for a change exceeds a threshold or the periodic reporting, and optionally carries the reporting periodicity.

Step 804: The central network analysis function sends a subscription message to the gNB 1 or the gNB 2.

An information element of the message includes:

(1) Data: [Network performance parameter 1—quantity of RRC connections (average & maximum), threshold], [network performance parameter 2—quantity of PDU sessions, threshold], [network performance parameter 3—PRB utilization (uplink & downlink), threshold], [network performance parameter 4—handover (HO) success rate, threshold], [network performance parameter 5—handover (HO) failure rate, threshold], [network performance parameter 6—D2D resource utilization, threshold], [network performance parameter 7—Uu interface resource utilization, threshold], [network performance parameter 8—PDCCH congestion, threshold], [network performance parameter 9—RACH success rate, threshold], [network performance parameter 10—RACH failure rate, threshold], and [network performance parameter 11—air interface delay, threshold].

(2) Target cells: Cell 1, cell 2, cell 3, and cell 4.

(3) Reporting mode: Reporting performed for initial subscription & (reporting triggered for a change exceeds a threshold or periodic reporting [reporting periodicity]).

It should be noted that step 804 may alternatively be replaced with a step that the distributed network analysis functions respectively send subscription messages to the gNB 1 and the gNB 2. For example, the "network analysis function (distributed 1)" subscribes to network performance parameter information of the cell 1 and the cell 3 from the gNB 1, and the "network analysis function (distributed 2)" subscribes to network performance parameter information of the cell 2 and the cell 4 from the gNB 2. Data and a reporting mode included in the subscription message sent by the "network analysis function (distributed 1)" to the gNB 1 are the same as those carried in the subscription message sent by the central network analysis function to the gNB 1, but the target cells are the cell 1 and the cell 3. Data and a reporting mode included in the subscription message sent by the "network analysis function (distributed 2)" to the gNB 2 are the same as those carried in the subscription message sent by the central network analysis function to the gNB 2, but the target cells are the cell 2 and the cell 4.

Step 805: The OAM sends a notification message to the central network analysis function.

An information element of the message includes:

Data: Fault/alarm information of the AMF 1, the SMF 1, the UPF 1, the PCF 1, the UDM 1, the NRF 1, the gNB 1, and the gNB 2.

Step 806: The AMF 1, the SMF 1, the UPF 1, the PCF 1, the UDM 1, or the NRF 1 sends a notification message to the central network analysis function.

An information element of the message includes:

Data: [Network performance parameter 1—load, value], [network performance parameter 2—throughput, value], and [network performance parameter 3—quantity of users, value].

Step 807: The gNB 1 or the gNB 2 sends a notification message to the central network analysis function.

An information element of the message includes:

(1) Data: [Network performance parameter 1—quantity of RRC connections (average & maximum), value], [network performance parameter 2—quantity of PDU sessions, value], [network performance parameter 3—PRB utilization (uplink & downlink), value], [network performance parameter 4—handover success rate, value], [network performance parameter 5—handover failure rate, value], [network performance parameter 6—D2D resource utilization, value], [network performance parameter 7—Uu interface resource utilization, value], [network performance parameter 8—PDCCH congestion, value], [network performance parameter 9—RACH success rate, value], [network performance parameter 10—RACH failure rate, value], and [network performance parameter 11—air interface delay, value].

(2) Cells: Cell 1, cell 2, cell 3, and cell 4.

In an alternative implementation of step 807, the gNB 1 and the gNB 2 respectively send notification messages to the "network analysis function (distributed 1)" and the "network analysis function (distributed 2)". Data included in the notification message sent by the gNB 1 to the "network analysis function (distributed 1)" is the same as that carried in the notification message sent by the gNB 1 to the central network analysis function, but the cells are the cell 1 and the cell 3. Data included in the notification message sent by the gNB 2 to the "network analysis function (distributed 2)" is the same as that carried in the notification message sent by the gNB 2 to the central network analysis function, but the cells are the cell 2 and the cell 4.

Step 808: The network analysis function analyzes and processes the received notification message.

In an implementation, cell performance analysis may be performed according to the following steps:

Step 8081: If any one of the AMF 1, the SMF 1, the UPF 1, the PCF 1, the UDM 1, and the NRF 1 is faulty, determine that network performance of the cell 1, the cell 2, the cell 3, and the cell 4 all cannot support the V2X service; otherwise, go to step 8082.

Step 8082: If network performance parameter information of any one of the AMF 1, the SMF 1, the UPF 1, the PCF 1, the UDM 1, and the NRF 1 exceeds a threshold for a normal service, determine that the network performance of the cell 1, the cell 2, the cell 3, and the cell 4 all cannot support the V2X service; otherwise, go to step 8083 and step 8085.

Step 8083: If the gNB 1 is faulty, the network performance of the cell 1 and the cell 3 cannot support the V2X service; otherwise, go to step 8084.

Step 8084: Check network performance parameter information of each of the cell 1 and the cell 3 to determine whether the V2X service can be supported, separately predict, based on historical network performance parameter information and the current network performance parameter information of the cell 1 and the cell 3, the network performance parameter information of the cell 1 and the cell 3 after a time interval subscribed by the V2X server, and go to step 8087.

Step 8085: If the gNB 2 is faulty, the network performance of the cell 2 and the cell 4 cannot support the V2X service; otherwise, go to step 8086.

Step 8086: Check network performance parameter information of each of the cell 2 and the cell 4 to determine whether the V2X service can be supported, separately predict, based on historical network performance parameter information and the current network performance parameter information of the cell 2 and the cell 4, the network performance parameter information of the cell 2 and the cell 4 after the time interval subscribed by the V2X server, and go to step 8087.

Step 8087: The analysis and processing end.

After the cell-granularity network performance parameter information is obtained, the network performance parameter information may be reported, the network performance parameter information and network element performance information may be reported (for example, whether normal services and values of corresponding network performance parameters can be provided), or the network performance parameter information, the network element performance information, and specific faulty network elements may be reported.

Optionally, after the cell granularity network performance parameter information is obtained, the network performance parameter information obtained through analysis/prediction may alternatively be mapped a network performance level according to predefined mapping rules.

In an implementation method, an example of mapping the network performance parameter information to the network performance level is as follows:

It is assumed that there are three predefined network performance levels: good, normal, and bad.

The mapping rules are as follows:

Rule 1: If any of the AMF 1, the SMF 1, the UPF 1, the PCF 1, the UDM 1, and the NRF 1 is faulty, network performance levels of the cell 1, the cell 2, the cell 3, and the cell 4 are all bad.

Rule 2: If network performance parameter information of any one of the AMF 1, the SMF 1, the UPF 1, the PCF 1, the UDM 1, or the NRF 1 exceeds a threshold for a normal service, network performance levels of the cell 1, the cell 2, the cell 3, and the cell 4 are all bad.

Rule 3: If the gNB 1 is faulty, network performance levels of the cell 1 and the cell 3 are all bad.

Rule 4: If any piece of network performance parameter information of the cell 1 exceeds a threshold for a normal service, a network performance level of the cell 1 is bad.

Rule 5: If any piece of network performance parameter information of the cell 3 exceeds a threshold for a normal service, a network performance level of the cell 3 is bad.

Rule 6: If the gNB 2 is faulty, network performance levels of the cell 2 and the cell 4 are all bad.

Rule 7: If any piece of network performance parameter information of the cell 2 exceeds a threshold for a normal service, a network performance level of the cell 2 is bad.

Rule 8: If any piece of network performance parameter information of the cell 4 exceeds a threshold for a normal service, a network performance level of the cell 4 is bad.

Rule 9: If the AMF 1, the SMF 1, the UPF 1, the PCF 1, the UDM 1, the NRF 1, and the gNB 1 are all not faulty,
- network performance parameters of the AMF 1, the SMF 1, the UPF 1, the PCF 1, the UDM 1, the NRF 1, and the cell 1 are all normal, and
- one or more of the network performance parameters of the AMF 1, the SMF 1, the UPF 1, the PCF 1, the UDM 1, the NRF 1, and the cell 1 fall within a threshold interval of normal, a network performance level of the cell 1 is normal.

The network performance parameter threshold interval is definable. An example of the definition is as follows:

If a value of a network performance parameter x≤A, a threshold interval within which the network performance parameter x falls is good.

If A<the value of the network performance parameter x≤B, the threshold interval within which the network performance parameter x falls is normal.

If B<the value of network performance parameter x, the threshold interval within which the network performance parameter x falls is bad, and services cannot be provided normally.

Rule 10: If the AMF 1, the SMF 1, the UPF 1, the PCF 1, the UDM 1, the NRF 1, and the gNB 1 are all not faulty,
  the network performance parameters of the AMF 1, the SMF 1, the UPF 1, the PCF 1, the UDM 1, the NRF 1, and the cell 1 are all normal, and
  network performance parameters of the AMF 1, the SMF 1, the UPF 1, the PCF 1, the UDM 1, the NRF 1, and the cell 1 are all fall within a threshold interval of good,
  a network performance level of the cell 1 is good.

Rules 11 and 12: A mapping rule of the cell 2 is similar to the rules 9 and 10. For details, refer to the foregoing descriptions. Details are not described again.

Rules 13 and 14: A mapping rule of the cell 3 is similar to the rules 9 and 10. For details, refer to the foregoing descriptions. Details are not described again.

Rules 15 and 16: A mapping rule of the cell 4 is similar to the rules 9 and 10. For details, refer to the foregoing descriptions. Details are not described again.

Further, data exchange between the central network analysis function and the distributed network analysis function may include the following cases:

Case 1: It is assumed that the distributed network analysis function needs to notify a nearby distributed V2X server of the network performance information and/or the network performance prediction information.

(1) The central network analysis function needs to synchronize the network element fault/alarm information to the distributed network analysis function.

(2) The central network analysis function needs to synchronize the network performance information and/or the network performance prediction information of the AMF 1, the SMF 1, the UPF 1, the PCF 1, the UDM 1, and the NRF 1 to the distributed network analysis function.

(3) If cell-granularity performance information of gNBs (including the gNB 1 and the gNB 2) is subscribed by the central network analysis function, the central "network analysis function" needs to synchronize network performance information and/or network performance prediction information of a corresponding cell to the distributed network analysis function.

Case 2: It is assumed that the central network analysis function needs to notify the central V2X server of the network performance information and/or the network performance prediction information.

If cell-granularity performance information of gNBs (including the gNB 1 and the gNB 2) is subscribed by the distributed network analysis function, the distributed network analysis function needs to synchronize the network performance information to the central network analysis function.

Step 809: The network analysis function sends a notification message to the V2X server.

An information element of the message includes:
(1) Data: [Network performance parameter 1, value], [network performance parameter 2, value], . . . , and [network performance parameter n, value].

In an alternative implementation method, the data in the information element may alternatively be [network performance level, value].

(2) Area: The cell 1, the cell 2, the cell 3, and the cell 4.

The network analysis function reports the network performance parameter/the network performance prediction information of the area to the V2X server when obtaining the network performance parameter/the network performance prediction information of the area for the first time. Subsequently, when the network performance information/the network performance prediction information exceeds or falls below a threshold, the network performance parameter/the network performance prediction information is then reported to the V2X server.

According to a subscription requirement of the V2X server, the central network analysis function may uniformly notify the V2X server of the network performance information of the cell 1, the cell 2, the cell 3, and the cell 4. Alternatively, the distributed network analysis function may separately notify the distributed V2X server of the network performance information of the cell 1 and the cell 3, and the cell 2 and the cell 4.

This embodiment has the following beneficial effects: cell-level network performance information may be subscribed from the gNB, cell-level network performance analysis and prediction may be performed, and accurate real-time cell-level network performance information/network performance prediction information may be provided to the V2X server.

Figure 9:
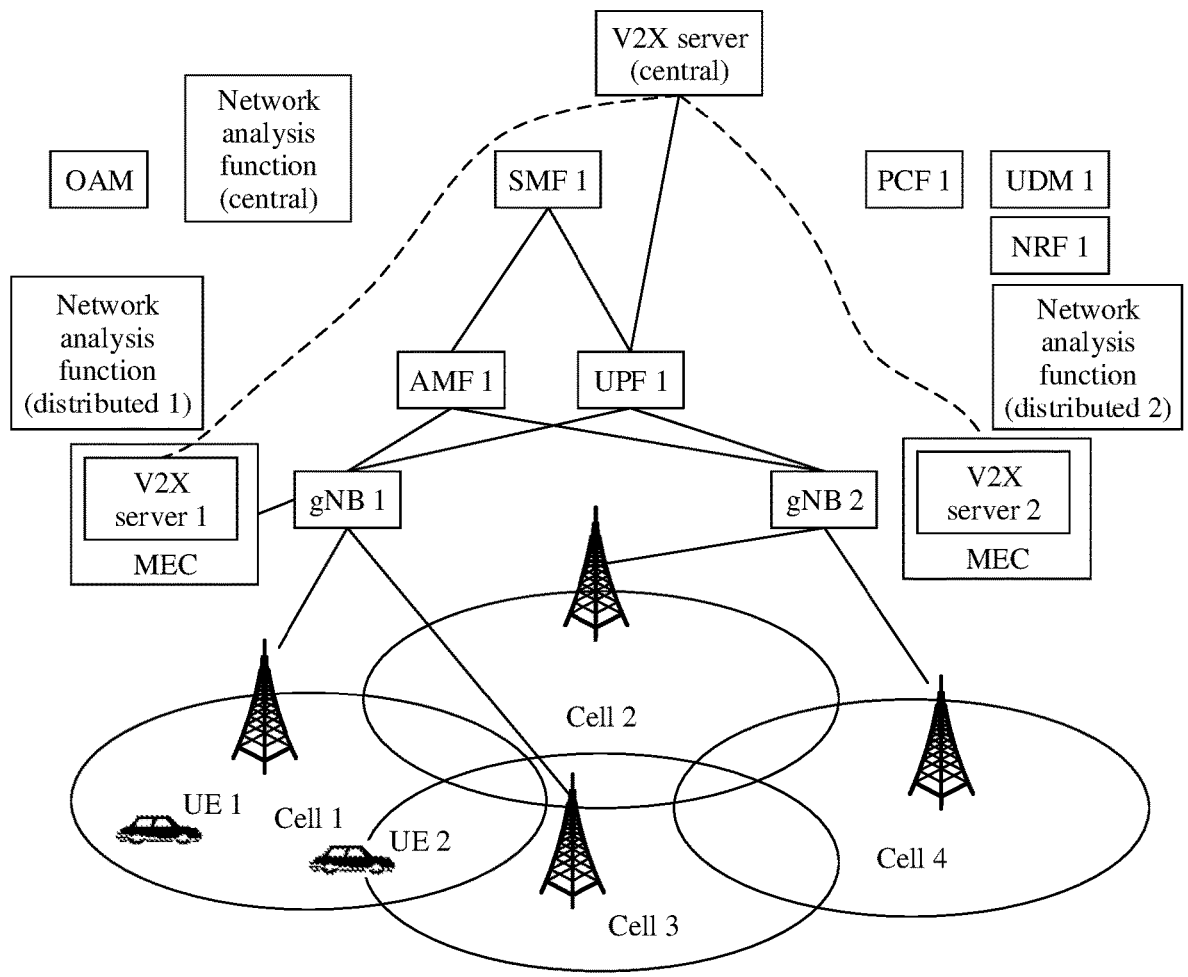
FIG. 9 is an example diagram of another scenario of network performance analysis according to the embodiments.

FIG. 9 is an example diagram of another scenario of network performance analysis according to this application. In this example, based on subscription to a RAN or off-line data collection, network performance information or network performance prediction information based on a moving track of UE is provided, to support an autonomous driving service.

In this example, there are four cells in an area where the autonomous driving service can be run, which are described as a cell 1, a cell 2, a cell 3, and a cell 4. Two gNBs are described as a gNB 1 and a gNB 2. An AMF, an SMF, a UPF, a PCF, UDM, and an NRF are respectively described as an AMF 1, an SMF 1, a UPF 1, a PCF 1, UDM 1, and an NRF 1.

V2X servers are deployed in distributed mode, and include one central V2X server (central), and two remote distributed V2X servers, namely, a V2X server 1 and a V2X server 2.

Network analysis functions are deployed in distributed mode, and include one central "network analysis function (central)", and two remote distributed network analysis functions, namely, a "network analysis function (distributed 1)" and a "network analysis function (distributed 2)", which are respectively deployed close to the V2X server 1 and the V2X server 2.

Two autonomous driving vehicles are UE 1 and UE 2.

The V2X server subscribes to the network performance information and the network performance prediction information of the area from the network analysis function. Steps are as follows:

Step 901: The central V2X server sends a subscription message to the central network analysis function.

An information element of the message includes:

(1) Data: [Network performance parameter 1, threshold], [network performance parameter 2, threshold], . . . , and [network performance parameter n, threshold].

In another implementation method, the data in the information element may alternatively be [network performance level, threshold].

(2) Target area: Cells corresponding to moving tracks of the UE 1 and the UE 2.

(3) Reporting mode: Reporting performed for initial subscription of a cell in which the UE is currently located & (reporting performed when the UE enters a new cell & reporting for a change exceeds a threshold in a staying periodicity of the UE or reporting based on prediction [predicting a next cell that the UE is to enter, entering time])

(4) Reporting destination: [Central V2X server].

In another implementation method, the reporting destination in the information element may alternatively be [cell 1, cell 3 to V2X server 1] or [cell 2, cell 4 to V2X server 2].

The reporting for a change exceeds a threshold in a staying periodicity refers to reporting performed when the network performance information changes and reaches the threshold and the UE stays in the cell.

Step 902: The central network analysis function sends a subscription message to OAM.

An information element of the message includes:

(1) Data: Fault/alarm information.

(2) Target network elements: The AMF 1, the SMF 1, the UPF 1, the PCF 1, the UDM 1, the NRF 1, the gNB 1, and the gNB 2.

(3) Reporting mode: Reporting performed for initial subscription & reporting for an occurrence.

Step 903: The central network analysis function sends a subscription message to the AMF 1, the SMF 1, the UPF 1, the PCF 1, the UDM 1, or the NRF 1.

An information element of the message includes:

(1) Data: [Network performance parameter 1—load, threshold], [network performance parameter 2—throughput, threshold], and [network performance parameter 3—quantity of users, threshold].

(2) Reporting mode: Reporting performed for initial subscription & (reporting triggered for a change exceeds a threshold or periodic reporting [reporting periodicity]).

Step 904: The central network analysis function sends a subscription message to the gNB 1 or the gNB 2.

An information element of the message includes:

(1) Data: [network performance parameter 1—quantity of RRC connections (average & maximum), threshold], [network performance parameter 2—quantity of PDU sessions, threshold], [network performance parameter 3—PRB utilization (uplink & downlink), threshold], [network performance parameter 4—handover success rate, threshold], [network performance parameter 5—handover failure rate, threshold], [network performance parameter 6—D2D resource utilization, threshold], [network performance parameter 7—Uu interface resource utilization, threshold], [network performance parameter 8—PDCCH congestion, threshold], [network performance parameter 9—RACH success rate, threshold], [network performance parameter 10—RACH failure rate, threshold], and [network performance parameter 11—air interface delay, threshold].

(2) Target cells: Cell 1, cell 2, cell 3, and cell 4.

(3) Reporting mode: Reporting performed for initial subscription & (reporting triggered for a change exceeds a threshold or periodic reporting [reporting periodicity]).

It should be noted that step 904 may alternatively be replaced with a step that the distributed network analysis functions respectively send subscription messages to the gNB 1 and the gNB 2. For example, the "network analysis function (distributed 1)" subscribes to performance data of the cell 1 and the cell 3 from the gNB 1, and the "network analysis function (distributed 2)" subscribes to performance data of the cell 2 and the cell 4 from the gNB 2. Data and a reporting mode included in the subscription message sent by the "network analysis function (distributed 1)" to the gNB 1 are the same as those carried in the subscription message sent by the central network analysis function to the gNB 1, but the target cells are the cell 1 and the cell 3. Data and a reporting mode included in the subscription message sent by the "network analysis function (distributed 2)" to the gNB 2 are the same as those carried in the subscription message sent by the central network analysis function to the gNB 2, but the target cells are the cell 2 and the cell 4.

Figure 10A:
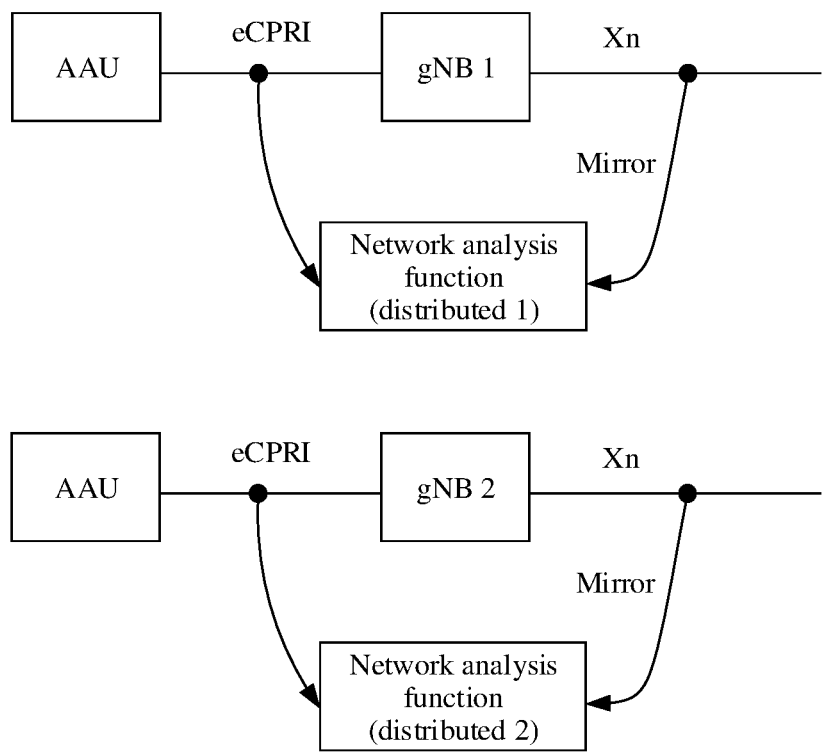
FIG. 10A is a schematic diagram of collecting data by using mirrored data on a network interface link.

In another alternative implementation method of step 904, as shown in FIG. 10A, the distributed network analysis function may alternatively collect data from the gNB 1 or the gNB 2 by using the following method, that is, mirroring data on a network interface link. For example, mirroring is performed on an enhanced common public radio interface (enhanced common public radio interface, eCPRI) and an Xn interface link on the gNB 1 side, and data of the two interfaces is mirrored to the "network analysis function (distributed 1)". Mirroring is performed on an eCPRI and an Xn interface link on the gNB 2 side, and data of the two interfaces is mirrored to the "network analysis function (distributed 2)".

Figure 10B:
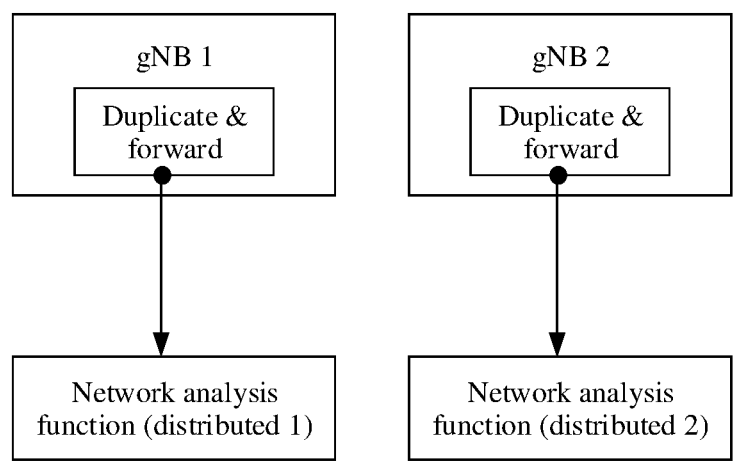
FIG. 10B is a schematic diagram of collecting data through traffic duplication.

In another alternative implementation method of step 904, as shown in FIG. 10B, the distributed network analysis function may alternatively collect data from the gNB 1 or the gNB 2 by using the following method, that is, the gNB duplicates and forwards required network traffic to the network analysis function. For example, the gNB 1 duplicates full data on an eCPRI and an Xn interface of the gNB 1, and forwards the data to the "network analysis function (distributed 1)". The gNB 2 duplicates full data on an eCPRI and an Xn interface of the gNB 2, and forwards the data to the "network analysis function (distributed 2)". It should be noted that the gNB 1 and the gNB 2 may also set a forwarding rule for duplicating and forwarding only some traffic on the foregoing interfaces. The rule is definable.

Step 905: The central network analysis function or the distributed network analysis function sends a subscription message to the gNB 1 or the gNB 2.

In the first case, an information element of the message includes:

(1) Data: Cell change (event: cell change).

(2) Target users: UE 1 and UE 2.

(3) Reporting mode: Reporting performed for initial subscription & reporting for a change.

In the second case, an information element of the message includes:

(1) Data: Measurement report (including RSRP, RSRQ, an SINR, a throughput of UE (downlink, uplink, and a throughput of each network slice instance accessed by the UE), CSI, and the like).

(2) Target users: UE 1 and UE 2.

(3) Reporting mode: Continuous reporting in streaming mode (that is, the gNB reports upon obtaining).

It should be noted that, in an implementation method, the first case is always performed, and the second case is optional.

In another implementation method, the first case is not performed, and the second case is performed.

Additionally, it may be understood that the foregoing two cases may also be combined.

It should be noted that if the distributed network analysis function sends the subscription message to the gNB 1 or the gNB 2, the "network analysis function (distributed 1)" sends the subscription message to the gNB 1, and the "network analysis function (distributed 2)" sends the subscription message to the gNB 2.

Step 906: The OAM sends a notification message to the central network analysis function.

An information element of the message includes:

Data: Fault/alarm information of the AMF 1, the SMF 1, the UPF 1, the PCF 1, the UDM 1, the NRF 1, the gNB 1, and the gNB 2.

Step 907: The AMF 1, the SMF 1, the UPF 1, the PCF 1, the UDM 1, or the NRF 1 sends a notification message to the central network analysis function.

An information element of the message includes:

Data: [Network performance parameter 1—load, value], [network performance parameter 2—throughput, value], and [network performance parameter 3—quantity of users, value].

Step 908: The gNB 1 or the gNB 2 sends a notification message to the central network analysis function.

In one case, an information element of the message includes:

(1) Data: [Network performance parameter 1—quantity of RRC connections (average & maximum), value], [network performance parameter 2—quantity of PDU sessions, value], [network performance parameter 3—PRB utilization (uplink & downlink), value], [network performance parameter 4—handover success rate, value], [network performance parameter 5—handover failure rate, value], [network performance parameter 6—D2D resource utilization, value], [network performance parameter 7—Uu interface resource utilization, value], [network performance parameter 8—PDCCH congestion, value], [network performance parameter 9—RACH success rate, value], [network performance parameter 10—RACH failure rate, value], and [network performance parameter 11—air interface delay, value].

(2) Cells: Cell 1, cell 2, cell 3, and cell 4.

In an alternative implementation of step 908, the gNB 1 and the gNB 2 respectively send notification messages to the "network analysis function (distributed 1)" and the "network analysis function (distributed 2)". Data included in the notification message sent by the gNB 1 to the "network analysis function (distributed 1)" is the same as that carried in the notification message sent by the gNB 1 to the central network analysis function, but the cells are the cell 1 and the cell 3. Data included in the notification message sent by the gNB 2 to the "network analysis function (distributed 2)" is the same as that carried in the notification message sent by the gNB 2 to the central network analysis function, but the cells are the cell 2 and the cell 4.

In another case, an information element of the message includes:

1. Data: Cell ID (CGI) and measurement report.

(2) Users: UE 1 and UE 2.

Also, it may be understood that the foregoing two cases may be combined. For example, the notification message carries the data in the foregoing two cases, or two notification messages are sent, and each carries the information element in the foregoing two cases.

Step 909: The network analysis function analyzes and processes the received notification message.

1. Analyze cell performance.

The cell performance may be analyzed in the manner of step 808 in the foregoing embodiment.

2. Draw a moving track of the UE and calculate a moving direction and a moving speed of the UE.

Further, the network analysis function may further determine the cell reported to the V2X server. If the V2X server has just subscribed to the cell, and the cell has not been reported to the V2X server, cell ID information recently notified by the gNB is reported. If the V2X server subscribes to "reporting performed when a new cell is entered & reporting for a change exceeds a threshold in a staying period", the cell ID information recently notified by the gNB is reported. If the V2X server subscribes to "reporting based on prediction", a next cell to be entered and a time point are predicted based on the moving speed and the moving direction of the UE, and information about the next cell is reported.

Optionally, after the cell-granularity network performance parameter information is obtained, the network performance parameter information obtained through analysis/prediction may alternatively be mapped a network performance level according to predefined mapping rules.

Further, data exchange between the central network analysis function and the distributed network analysis function may include the following cases:

Case 1: It is assumed that the distributed network analysis function needs to notify a nearby distributed V2X server of the network performance information and/or the network performance prediction information.

(1) The central network analysis function needs to synchronize the network element fault/alarm information to the distributed network analysis function.

(2) The central network analysis function needs to synchronize the network performance information and/or the network performance prediction information of the AMF 1, the SMF 1, the UPF 1, the PCF 1, the UDM 1, and the NRF 1 to the distributed network analysis function.

(3) If information about the gNB is subscribed by the central network analysis function, the central network analysis function needs to synchronize a cell, a measurement report, and network performance information and/or network performance prediction information that are to be reported to the distributed network analysis function.

Case 2: It is assumed that information about the gNB is subscribed by the distributed network analysis function. The distributed network analysis function needs to synchronize the moving track of the UE that is obtained through analysis to the central network analysis function, and the central network analysis function then needs to synchronize the moving track of the UE to another distributed network analysis function.

Case 3: It is assumed that the central network analysis function needs to notify the central V2X server of the network performance information and/or the network performance prediction information.

If the cell-granularity network performance parameter information and/or network performance parameter prediction information of the gNB is subscribed by the distributed network analysis function, the distributed network analysis function needs to synchronize one or more of a cell, cell-granularity network performance parameter information, and cell-granularity network performance parameter prediction information that are to be reported to the central network analysis function.

Step 910: The network analysis function sends a notification message to the V2X server.

An information element of the message includes:

(1) Data: [Network performance parameter 1, value], [network performance parameter 2, value], . . . , and [network performance parameter n, value].

In an alternative implementation method, the data in the information element may alternatively be [network performance level, value].

(2) Area: Cell x.

(3) Time: Current time (at the same time, it may be indicated that the cell x is a cell in which the UE is currently located) or time for predicting a new cell to be entered (at the same time, it may be indicated that the cell x is a new cell to which the UE is predicted to enter).

When obtaining the cell in which the UE is located for the first time, the network analysis function reports the network performance information/the network performance prediction information of the cell to the V2X server. Subsequently, if the network performance information/the network performance prediction information in a staying periodicity of the cell exceeds or falls below a threshold, the network performance information/the network performance prediction information of the cell is then reported to the V2X server. Subsequently, when the UE enters a new cell, network performance information of the new cell is reported to the V2X server, or the network performance information and a time point of entering the new predicted cell that the UE is to enter are reported to the V2X server. If network performance of the cell before the UE enters the new cell exceeds or falls below a threshold, the network performance is then reported to the V2X server. Subsequently, if the new predicted cell changes, that is, a prediction result is corrected, the new "next cell", the time point of entering the next cell, and the network performance information of the cell are reported to the V2X server.

According to a subscription requirement of the V2X server, the central network analysis function may uniformly notify the V2X server of the network performance information. Alternatively, the distributed network analysis function may separately notify the distributed V2X server of the network performance information of the cell 1 and the cell 3, and the cell 2 and the cell 4.

This embodiment has at least the following beneficial effects: real-time network performance information/network performance prediction information based on an accurate moving track of the UE may be provided to the V2X server.

The solutions provided in the embodiments are described above from a perspective of interaction between network elements. It may be understood that, to implement the foregoing functions, the network elements include corresponding hardware structures and/or software modules for performing the foregoing functions. A person of ordinary skill in the art should be easily aware that, in combination with the examples described in the embodiments, units and algorithm steps may be implemented by hardware or a combination of hardware and computer software. Whether a function is performed by hardware or hardware driven by computer software depends on particular applications and design constraints of the solutions. A person of ordinary skill in the art may use different methods to implement the described functions for each particular application, but it should not be considered that the implementation goes beyond the scope of the embodiments.

Figure 11:
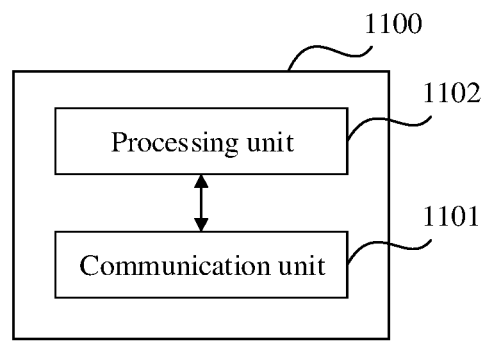
FIG. 11 is a schematic diagram of a network performance reporting apparatus according to the embodiments.

FIG. 11 is a possible example block diagram of a network performance reporting apparatus according to the embodiments. The apparatus 1100 may exist in a form of software or hardware. The apparatus 1100 may include a processing unit 1102 and a communication unit 1101. In an implementation, the communication unit 1101 may include a receiving unit and a sending unit. The processing unit 1102 is configured to control and manage an action of the apparatus 1100. The communication unit 1101 is configured to support the apparatus 1100 in communicating with another network entity.

The processing unit 1102 may be a processor or a controller, for example, may be a general-purpose central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing unit may implement or execute various examples of logical blocks, modules, and circuits described with reference to the content disclosed in the embodiments. The processor may be a combination of processors implementing a computing function, for example, a combination including one or more microprocessors, or a combination of a DSP and a microprocessor. The communication unit 1101 is an interface circuit of the apparatus, and is configured to receive a signal from another apparatus. For example, when the apparatus is implemented in a form of a chip, the communication unit 1101 is an interface circuit used by the chip to receive a signal from another chip or apparatus, or is an interface circuit used by the chip to send a signal to another chip or apparatus.

The apparatus 1100 may be a data analysis network element, a second network element, an access network device, or OAM in the foregoing embodiments, or may be a chip used in a data analysis network element, a second network element, an access network device, or OAM. For example, when the apparatus 1100 is the data analysis network element, the second network element, the access network device, or the OAM, the processing unit 1102 may be, for example, a processor, and the communication unit 1101 may be, for example, a transceiver. Optionally, the transceiver may include a radio frequency circuit, and a storage unit may be, for example, a memory. For example, when the apparatus 1100 is the chip used in the data analysis network element, the second network element, the access network device, or the OAM, the processing unit 1102 may be, for example, a processor, and the communication unit 1101 may be, for example, an input/output interface, a pin, a circuit, or the like. The processing unit 1102 may execute computer-executable instructions stored in the storage unit. Optionally, the storage unit is a storage unit, for example, a register or a buffer, inside the chip. Alternatively, the storage unit may be a storage unit that is inside the data analysis network element, the second network element, the access network device, or the OAM and that is located outside the chip, for example, a read-only memory (ROM) or another type of static storage device that can store static information and instructions, or a random access memory (RAM).

In the first embodiment, the apparatus 1100 is the data analysis network element in the foregoing embodiments. The communication unit 1101 is configured to: receive a first subscription message from a first network element, where the first subscription message is used to request to subscribe to network performance parameter information of a first area; obtain the network performance parameter information of the first area from an access network device corresponding to the first area, where the network performance parameter information of the first area is used to indicate network performance of the first area; and when the processing unit 1102 determines that a first reporting condition is met, send the network performance parameter information of the first area or send a network performance level corresponding to the network performance parameter information of the first area to the first network element, where the network performance level is used to indicate the network performance of the first area. The processing unit 1102 is configured to determine that the first reporting condition is met.

In a possible implementation method, the communication unit 1101 is configured to: send a second subscription message to the access network device corresponding to the first area, where the second subscription message is used to request to subscribe to the network performance parameter information of the first area; and receive the network performance parameter information of the first area from the access network device corresponding to the first area, where the network performance parameter information of the first area is sent when a second reporting condition is met, where the second reporting condition includes one or both of the following: a reporting periodicity arrives, and the network performance parameter information of the first area that is subscribed by the data analysis network element reaches a first threshold.

In a possible implementation method, the network performance parameter information of the first area includes a network performance parameter and a corresponding value, and the network performance parameter includes one or more of the following: a quantity of radio resource control RRC connections, a quantity of protocol data unit PDU sessions, physical resource block PRB utilization, a handover success rate, a handover failure rate, device-to-device D2D resource utilization, Uu interface resource utilization, physical downlink control channel PDCCH congestion, a random access channel RACH success rate, a RACH failure rate, and an air interface delay.

In a possible implementation method, the first area includes one or more cells, and the first subscription message includes one or more cell identities; or the first area includes one or more tracking areas, and the first subscription message includes one or more tracking area identities.

In a possible implementation method, the first reporting condition includes one or both of the following: the network performance parameter information subscribed by the first network element reaches a second threshold, and the data analysis network element obtains the network performance parameter information of the first area for the first time.

In a possible implementation method, the first subscription message is further used to request to subscribe to network performance parameter prediction information of the first area. The processing unit 1102 is further configured to determine the network performance parameter prediction information of the first area based on the network performance parameter information of the first area and historical network performance parameter information of the first area. The communication unit 1101 is further configured to: when the processing unit 1102 determines that a third reporting condition is met, send the network performance parameter prediction information of the first area to the first network element.

In a possible implementation method, the third reporting condition includes one or both of the following: the network performance parameter prediction information of the first area that is subscribed by the first network element reaches a third threshold, and the apparatus obtains the network performance parameter prediction information of the first area for the first time.

In a possible implementation method, the first subscription message includes an identifier of a terminal device, and the first area is a cell in which the terminal device is located.

In a possible implementation method, the first reporting condition includes one or both of the following: the terminal device enters the first area, and the network performance parameter information of the first area that is subscribed by the first network element reaches a fourth threshold.

In a possible implementation method, the first subscription message is further used to request to subscribe to network performance parameter prediction information of a second area, and the second area is a next cell that the terminal device is to enter. The communication unit 1101 is further configured to obtain network performance parameter information of the second area from an access network device corresponding to the second area, where the network performance parameter information of the second area is used to indicate network performance of the second area. The processing unit 1102 is further configured to determine the network performance parameter prediction information of the second area based on the network performance parameter information of the second area and historical network performance parameter information of the second area. The communication unit 1101 is further configured to: when the processing unit 1102 determines that a fourth reporting condition is met, send the network performance parameter prediction information of the second area to the first network element.

In a possible implementation method, the fourth reporting condition includes one or both of the following: It is determined that the terminal device is to enter the second area, and the network performance parameter prediction information of the second area that is subscribed by the first network element reaches a fifth threshold.

In a possible implementation method, the communication unit 1101 is further configured to obtain location information of the terminal device from the access network device corresponding to the first area, where the location information of the terminal device is information about the first area. The processing unit 1102 is further configured to: determine a moving track of the terminal device based on the location information of the terminal device and historical location information of the terminal device, where the moving track is used to indicate a moving direction of the terminal device and locations passed by the terminal device when the terminal device moves; and determine, based on the moving track and a network topology structure, information about the second area that the terminal device is to enter, where the network topology structure is used to indicate distribution locations of cells in a network, and the cells include the first area and the second area.

In a possible implementation method, the communication unit 1101 is configured to: send a third subscription message to the access network device corresponding to the first area, where the third subscription message is used to request to subscribe to the location information of the terminal device; and receive the location information of the terminal device from the access network device, where the location information of the terminal device is sent when a fifth reporting condition is met, where the fifth reporting condition includes one or both of the following: a location of the terminal device changes, and a reporting periodicity arrives.

In a possible implementation method, the communication unit 1101 is further configured to obtain a measurement report of the terminal device from the access network device. The processing unit 1102 is further configured to: determine longitude and latitude information of the terminal device based on the measurement report of the terminal device; determine a moving track of the terminal device based on the longitude and latitude information of the terminal device and the longitude and latitude information of the terminal device, where the moving track is used to indicate a moving direction of the terminal device and locations passed by the terminal device when the terminal device moves; and determine, based on the moving track and a network topology structure, the second area that the terminal device is to enter, where the network topology structure is used to indicate distribution locations of cells in a network, and the cells include the first area and the second area.

In a possible implementation method, the communication unit 1101 is configured to: send a fourth subscription message to the access network device corresponding to the first area, where the fourth subscription message is used to request to subscribe to the measurement report of the terminal device; and receive the measurement report of the terminal device from the access network device corresponding to the first area, where the measurement report of the terminal device is sent when a sixth reporting condition is met, where the sixth reporting condition includes one or both of the following: the access network device corresponding to the first area receives the measurement report, and a reporting periodicity arrives.

In a possible implementation method, the measurement report of the terminal device includes one or more of the following: RSRP, RSRQ, a SINR, a throughput of the terminal device, and CSI.

In a possible implementation method, the communication unit 1101 is further configured to: obtain network element performance information from a second network element corresponding to the first area, where the network element performance information is used to indicate performance of the second network element; and send the network element performance information of the first area to the first network element.

In a possible implementation method, the network element performance information includes one or more of the following: load of a network element, a throughput of the network element, and a quantity of users of the network element.

In a possible implementation method, the communication unit 1101 is further configured to: obtain fault information of a network element corresponding to the first area from an operation, administration, and maintenance OAM system corresponding to the first area; and send the fault information of the network element corresponding to the first area to the first network element.

In the second embodiment, the apparatus 1100 is the second network element in the foregoing embodiments. The communication unit 1101 is configured to receive a subscription message from a data analysis network element, where the subscription message is used to request to subscribe to network element performance information of the second network element, and the network element performance information is used to indicate performance of the second network element. When a reporting condition is met, the communication unit 1101 is further configured to send the network element performance information of the second network element to the data analysis network element.

In a possible implementation method, the reporting condition includes one or both of the following: a reporting periodicity arrives, and the network performance information of the second network element that is subscribed by the data analysis network element reaches a threshold.

In a possible implementation method, the network element performance information includes one or more of the following: load of a network element, a throughput of the network element, and a quantity of users of the network element.

In the third embodiment, the apparatus 1100 is the access network device in the foregoing embodiments. The communication unit 1101 is configured to: receive a second subscription message from a data analysis network element, where the second subscription message is used to request to subscribe to network performance parameter information of a first area, and the network performance parameter information of the first area is used to indicate network performance of the first area; and when the processing unit 1102 determines that a second reporting condition is met, send the network performance parameter information of the first area to the data analysis network element. The processing unit 1102 is configured to determine that the second reporting condition is met.

In a possible implementation method, the second reporting condition includes one or both of the following: a reporting periodicity arrives, and the network performance parameter information of the first area that is subscribed by the data analysis network element reaches a first threshold.

In a possible implementation method, the network performance parameter information of the first area includes a network performance parameter and a corresponding value, and the network performance parameter includes one or more of the following: a quantity of RRC connections, a quantity of PDU sessions, PRB utilization, a handover success rate, a handover failure rate, D2D resource utilization, Uu interface resource utilization, PDCCH congestion, a RACH success rate, a RACH failure rate, and an air interface delay.

In a possible implementation method, the communication unit 1101 is further configured to: receive a third subscription message from the data analysis network element, where the third subscription message is used to request to subscribe to location information of a terminal device; and when the processing unit 1102 determines that a fifth reporting condition is met, send the location information of the terminal device to the data analysis network element.

In a possible implementation method, the fifth reporting condition includes one or both of the following: a location of the terminal device changes, and a reporting periodicity arrives.

In a possible implementation method, the communication unit 1101 is further configured to receive a fourth subscription message from the data analysis network element, where the fourth subscription message is used to request to subscribe to a measurement report of the terminal device; and when the processing unit 1102 determines that a sixth reporting condition is met, send the measurement report of the terminal device to the data analysis network element.

In a possible implementation method, the sixth reporting condition includes one or both of the following: the communication unit 1101 receives the measurement report of the terminal device, and a reporting periodicity arrives.

In a possible implementation method, the measurement report of the terminal device includes one or more of the following: RSRP, RSRQ, a SINR, a throughput of the terminal device, and CSI.

In the fourth embodiment, the apparatus 1100 is the OAM in the foregoing embodiments. The communication unit 1101 is configured to receive a subscription message from a data analysis network element, where the subscription message is used to request to subscribe to fault information of a network element corresponding to a first area. When a reporting condition is met, the communication unit 1101 is further configured to send the fault information of the network element corresponding to the first area to the data analysis network element.

In a possible implementation method, the reporting condition includes: a fault alarm occurs on the network element corresponding to the first area.

It may be understood that, for a specific implementation process and corresponding beneficial effects when the apparatus is used for the foregoing network performance reporting method, refer to related descriptions in the foregoing method embodiments. Details are not described herein again.

Figure 12:
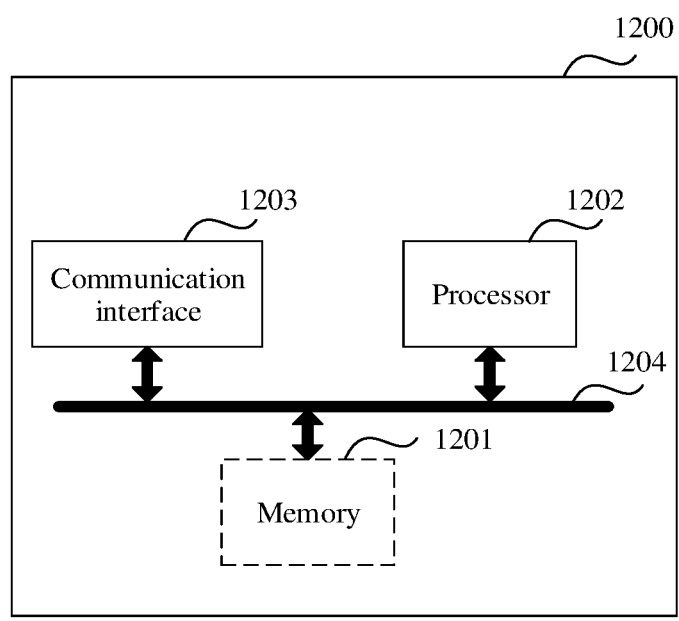
FIG. 12 is a schematic diagram of another network performance reporting apparatus according to the embodiments.

FIG. 12 is a schematic diagram of a network performance reporting apparatus according to the embodiments. The apparatus may be a data analysis network element, a second network element, an access network device, or OAM in the foregoing embodiments. The apparatus 1200 includes a processor 1202 and a communication interface 1203. Optionally, the apparatus 1200 may further include a memory 1201. Optionally, the apparatus 1200 may further include a communication line 1204. The communication interface 1203, the processor 1202, and the memory 1201 may be connected to each other through the communication line 1204. The communication line 1204 may be a peripheral component interconnect (PCI for short) bus, an extended industry standard architecture (for short) bus, or the like. The communication line 1204 may be classified into an address bus, a data bus, a control bus, and the like. For ease of representation, only one thick line is used to represent the bus in FIG. 12, but this does not mean that there is only one bus or only one type of bus.

The processor 1202 may be a CPU, a microprocessor, an ASIC, or one or more integrated circuits configured to control program execution in the solutions of the embodiments.

The communication interface 1203 is configured to communicate with another device or a communication network such as the Ethernet, a RAN, a wireless local area network (WLAN), or a wired access network by using any apparatus such as a transceiver.

The memory 1201 may be a ROM, another type of static storage device that can store static information and instructions, a RAM, or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by a computer, but is not limited thereto. The memory may exist independently, and is connected to the processor through the communication line 1204. Alternatively, the memory may be integrated with the processor.

The memory 1201 is configured to store computer-executable instructions for executing the solutions of this application, and the processor 1202 controls the execution. The processor 1202 is configured to execute the computer-executable instructions stored in the memory 1201, to implement the network performance reporting methods provided in the foregoing embodiments of this application.

Optionally, the computer-executable instructions in this embodiment of the embodiments may also be referred to as application program code. This is not limited in this embodiment.

A person of ordinary skill in the art may understand that various reference numerals such as "first" and "second" are merely distinguished for convenient description, and are not used to limit a scope of the embodiments, and also represent a sequence. The term "and/or" describes an association relationship for describing associated objects and represents that three relationships may exist. For example, A and/or B may represent the following three cases: only A exists, both A and B exist, and only B exists. The character "/" usually represents an "or" relationship between the associated objects. The term "at least one" means one or more. At least two means two or more. "At least one", "any one", or a similar expression thereof means any combination of the items, including any combination of singular items (pieces) or plural items (pieces). For example, at least one (piece, or type) of a, b, or c may represent: a, b, c, a and b, a and c, b and c, or a, b, and c, where a, b, and c may be singular or plural. The term "a plurality of" means two or more, and another quantifier is similar to this. In addition, an element (element) that appears in singular forms "a", "an", and "the" does not mean "one or only one" unless otherwise specified in the context, but means "one or more". For example, "a device" means one or more such devices.

All or some of the foregoing embodiments may be implemented through software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in the embodiments of this application may implement or operate the described functions through a general-purpose processor, a digital signal processor, an ASIC, an FPGA or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in the embodiments may be directly embedded into hardware, a software unit executed by a processor, or a combination thereof. The software unit may be stored in a RAM, a flash memory, a ROM, an EPROM, an EEPROM, a register, a hard disk, a removable magnetic disk, a CD-ROM, or a storage medium in any other form in the art. For example, the storage medium may be connected to a processor, so that the processor may read information from the storage medium and write information to the storage medium. Optionally, the storage medium may alternatively be integrated into the processor. The processor and the storage medium may be disposed in an ASIC.

These computer program instructions may alternatively be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

Although the embodiments are described with reference to specific features and the embodiments thereof, it is clear that various modifications and combinations may be made to them without departing from the and scope of this application. Correspondingly, the embodiments and the accompanying drawings are merely examples and are considered as any of or all modifications, variations, combinations or equivalents that cover the scope of the embodiments. It is clearly that a person of ordinary skill in the art can make various modifications and variations to the embodiments without departing from the scope of the embodiments.

The invention claimed is:

1. A network performance reporting method, comprising:
   receiving, by a data analysis network element, a first subscription message from a first network element, wherein the first subscription message is used to request a subscription to network performance parameter information of a first area;
   obtaining, by the data analysis network element, the network performance parameter information of the first area from an access network device corresponding to the first area, wherein the network performance parameter information of the first area is used to indicate network performance of the first area; wherein the obtaining further comprises:
   sending, by the data analysis network element, a second subscription message to the access network device corresponding to the first area, wherein the second subscription message is used to request the subscription to the network performance parameter information of the first area and the second subscription message contains a first threshold; and
   when determining that a first reporting condition is met, sending, by the data analysis network element, the network performance parameter information of the first area or a network performance level corresponding to the network performance parameter information of the first area to the first network element, wherein the network performance level is used to indicate quality of the network performance of the first area; wherein
   determining, by the data analysis network element, the network performance level further include a moving track of the terminal device based on a location information and a network topology structure.

2. The network performance reporting method according to claim 1, wherein the obtaining step further comprises:
   sending, by the data analysis network element, a second subscription message to the access network device corresponding to the first area, wherein the second subscription message is used to request the subscription to the network performance parameter information of the first area; and
   receiving, by the data analysis network element, the network performance parameter information of the first area from the access network device corresponding to the first area, wherein the network performance parameter information of the first area is sent when a second reporting condition is met, and the second reporting condition comprises at least one of the following: an arrival of a reporting periodicity, or the network performance parameter information of the first area that is subscribed by the data analysis network element reaches the first threshold.

3. The network performance reporting method according to claim 1, wherein the network performance parameter information of the first area comprises a network performance parameter and a corresponding value, and the network performance parameter comprises one or more of the following:
   a quantity of radio resource control (RRC) connections, a quantity of protocol data unit (PDU) sessions, physical resource block (PRB) utilization, a handover success rate, a handover failure rate, device-to-device (D2D) resource utilization, Uu interface resource utilization, physical downlink control channel (PDCCH) congestion, a random access channel (RACH) success rate, a RACH failure rate, and an air interface delay.

4. The network performance reporting method according to claim 1, wherein either the first area comprises one or more cells, and the first subscription message comprises one or more cell identities, or the first area comprises one or more tracking areas, and the first subscription message comprises one or more tracking area identities.

5. The network performance reporting method according to claim 4, wherein the first reporting condition comprises one or both of the following:
   the network performance parameter information subscribed by the first network element reaches a second threshold, and the data analysis network element obtains the network performance parameter information of the first area for a first time.

6. The network performance reporting method according to claim 5, further comprising:
   requesting, with the first subscription message, a subscription to network performance parameter prediction information of the first area;
   determining, by the data analysis network element, the network performance parameter prediction information of the first area based on the network performance parameter information of the first area and historical network performance parameter information of the first area; and
   when determining that a third reporting condition is met, sending, by the data analysis network element, the network performance parameter prediction information of the first area to the first network element.

7. The network performance reporting method according to claim 6, wherein the third reporting condition comprises one or both of the following:
the network performance parameter prediction information of the first area that is subscribed by the first network element reaches a third threshold, and the data analysis network element obtains the network performance parameter prediction information of the first area for the first time.

8. The network performance reporting method according to claim 1, wherein the first subscription message comprises an identifier of a terminal device, and the first area is a cell in which the terminal device is located.

9. The network performance reporting method according to claim 8, wherein the first reporting condition comprises one or both of the following:
the terminal device enters the first area, and the network performance parameter information of the first area that is subscribed by the first network element reaches a fourth threshold.

10. The network performance reporting method according to claim 8, wherein the first subscription message is further used to request a subscription to network performance parameter prediction information of a second area, the second area is a next cell that the terminal device is to enter, and further comprising:
obtaining, by the data analysis network element, network performance parameter information of the second area from an access network device corresponding to the second area, wherein the network performance parameter information of the second area is used to indicate network performance of the second area;
determining, by the data analysis network element, the network performance parameter prediction information of the second area based on the network performance parameter information of the second area and historical network performance parameter information of the second area; and
when determining that a fourth reporting condition is met, sending, by the data analysis network element, the network performance parameter prediction information of the second area to the first network element.

11. The network performance reporting method according to claim 10, wherein the fourth reporting condition comprises one or both of the following:
the data analysis network element determines that the terminal device is to enter the second area, and the network performance parameter prediction information of the second area that is subscribed by the first network element reaches a fifth threshold.

12. The network performance reporting method according to claim 10, further comprising:
obtaining, by the data analysis network element, location information of the terminal device from the access network device corresponding to the first area, wherein the location information of the terminal device is information about the first area;
determining, by the data analysis network element, the moving track of the terminal device based on the location information of the terminal device and historical location information of the terminal device, wherein the moving track is used to indicate a moving direction of the terminal device and locations passed by the terminal device when the terminal device moves; and
determining, by the data analysis network element based on the moving track and the network topology structure, information about the second area that the terminal device is to enter, wherein the network topology structure is used to indicate distribution locations of cells in a network, and the cells comprise the first area and the second area.

13. A network performance reporting method, comprising:
receiving, by an access network device, a first subscription message from a data analysis network element, wherein the first subscription message is used to request a subscription to network performance parameter information of a first area, and the network performance parameter information of the first area is used to indicate network performance of the first area;
wherein the receiving further comprises:
sending, by the data analysis network element, a second subscription message to the access network device corresponding to the first area, wherein the second subscription message is used to request the subscription to the network performance parameter information of the first area and the second subscription message contains a first threshold; and
when a first reporting condition is met, sending, by the access network device, the network performance parameter information of the first area to the data analysis network element; wherein determining, by the data analysis network element, the network performance level further include a moving track of the terminal device based on a location information and a network topology structure.

14. The network performance reporting method according to claim 13, wherein the first reporting condition comprises one or both of the following: an arrival of a reporting periodicity and the network performance parameter information of the first area that is subscribed by the data analysis network element reaches the first threshold.

15. The network performance reporting method according to claim 13, wherein the method further comprises:
receiving, by the access network device, a second subscription message from the data analysis network element, wherein the second subscription message is used to request a subscription to location information of a terminal device; and
when a second reporting condition is met, sending, by the access network device, the location information of the terminal device to the data analysis network element.

16. The network performance reporting method according to claim 15, wherein the second reporting condition comprises one or both of the following: a location of the terminal device changes, and an arrival of a reporting periodicity.

17. The network performance reporting method according to claim 13, wherein the method further comprises:
receiving, by the access network device, a third subscription message from the data analysis network element, wherein the third subscription message is used to request a subscription to a measurement report of the terminal device; and
when a third reporting condition is met, sending, by the access network device, the measurement report of the terminal device to the data analysis network element.

18. The network performance reporting method according to claim 17, wherein the third reporting condition comprises one or both of the following: the access network device corresponding to the first area receives the measurement report of the terminal device, and an arrival of a reporting periodicity.

19. A network performance reporting apparatus, wherein the apparatus has a function of implementing a method comprising:
- receiving, by a data analysis network element, a first subscription message from a first network element, wherein the first subscription message is used to request a subscription to network performance parameter information of a first area;
- obtaining, by the data analysis network element, the network performance parameter information of the first area from an access network device corresponding to the first area, wherein the network performance parameter information of the first area is used to indicate network performance of the first area; wherein the obtaining further comprises:
- sending, by the data analysis network element, a second subscription message to the access network device corresponding to the first area, wherein the second subscription message is used to request the subscription to the network performance parameter information of the first area and the second subscription message contains a first threshold; and
- when determining that a first reporting condition is met, sending, by the data analysis network element, the network performance parameter information of the first area or a network performance level corresponding to the network performance parameter information of the first area to the first network element, wherein the network performance level is used to indicate quality of the network performance of the first area; wherein
- determining, by the data analysis network element, the network performance level further include a moving track of the terminal device based on a location information and a network topology structure.

20. A computing device, comprising a processor, a memory, a bus, and a communications interface, wherein the memory is configured to store a computing-device executable instruction, the processor is connected to the memory through the bus, and when the computing device operates, the processor executes the computing-device executable instruction stored in the memory, so that the computing device performs a network performance reporting method by being configured to:
- receive, by a data analysis network element, a first subscription message from a first network element, wherein the first subscription message is used to request a subscription to network performance parameter information of a first area;
- obtain, by the data analysis network element, the network performance parameter information of the first area from an access network device corresponding to the first area, wherein the network performance parameter information of the first area is used to indicate network performance of the first area; wherein the obtaining further comprises:
- sending, by the data analysis network element, a second subscription message to the access network device corresponding to the first area, wherein the second subscription message is used to request the subscription to the network performance parameter information of the first area and the second subscription message contains a first threshold; and
- when determining that a first reporting condition is met, send, by the data analysis network element, the network performance parameter information of the first area or a network performance level corresponding to the network performance parameter information of the first area to the first network element, wherein the network performance level is used to indicate quality of the network performance of the first area; wherein
- determining, by the data analysis network element, the network performance level further include a moving track of the terminal device based on a location information and a network topology structure.

21. A computing device, comprising a processor, a memory, a bus, and a communications interface, wherein the memory is configured to store a computing-device executable instruction, the processor is connected to the memory through the bus, and when the computing device operates, the processor executes the computing-device executable instruction stored in the memory, so that the computing device performs a method comprising receiving, by an access network device, a first subscription message from a data analysis network element, wherein the first subscription message is used to request a subscription to network performance parameter information of a first area, and the network performance parameter information of the first area is used to indicate network performance of the first area;
- sending, by the data analysis network element, a second subscription message to the access network device corresponding to the first area, wherein the second subscription message is used to request the subscription to the network performance parameter information of the first area and the second subscription message contains a first threshold; and
- when a first reporting condition is met, sending, by the access network device, the network performance parameter information of the first area to the data analysis network element; wherein
- determining, by the data analysis network element, the network performance level further include a moving track of the terminal device based on a location information and a network topology structure.

* * * * *